United States Patent [19]

Tanaka et al.

[11] Patent Number: 5,550,826
[45] Date of Patent: Aug. 27, 1996

[54] COMMUNICATION PROTOCOL FOR COMMUNICATING IMAGE DATA

[75] Inventors: Shigeo Tanaka, Tokyo; Hiroshi Yamazaki; Yoshio Osakabe, both of Kanagawa; Noriko Kotabe, Chiba; Koji Iwamoto; Yoko Souma, both of Nara; Toshihiro Imaura; Shigeru Maki, both of Osaka, all of Japan

[73] Assignees: Sony Corporation, Tokyo; Matsushita Electric Industrial Co., Limited, Osaka, both of Japan

[21] Appl. No.: 248,673

[22] Filed: May 25, 1994

[30] Foreign Application Priority Data

May 31, 1993 [JP] Japan .................................. 5-153013
Sep. 3, 1993 [JP] Japan .................................. 5-243616

[51] Int. Cl.$^6$ ........................................ H04J 3/24
[52] U.S. Cl. ........................ 370/85.8; 370/94.1; 348/706; 340/825.08
[58] Field of Search ............................. 370/94.1, 60, 61, 370/94.2, 85.1, 85.2, 85.3, 85.4, 110.1, 95.2, 85.8; 340/825.5, 895.51, 825.08; 348/706

[56] References Cited

U.S. PATENT DOCUMENTS

| | | | |
|---|---|---|---|
| 4,707,828 | 11/1987 | Yamada | 370/94.1 |
| 4,788,637 | 11/1988 | Tamaru | 370/94.1 |
| 5,031,175 | 7/1991 | Tanaka et al. | 370/94.1 |
| 5,343,469 | 8/1994 | Ohshimu | 370/85.1 |
| 5,402,419 | 3/1995 | Osakabe et al. | 370/94.1 |

*Primary Examiner*—Douglas W. Olms
*Assistant Examiner*—Ajit Patel
*Attorney, Agent, or Firm*—Jay H. Maioli

[57] ABSTRACT

A communication protocol can communicate data among apparatus by a simple procedure efficiently. In an AV center (1) (D2B control unit (1a), for example, a communication mode thereof is set in the master transmission mode, and a packet of one frame is transmitted to a TV (2). In the TV 2 (D2B control unit (2a)), its communication mode is set in the slave reception mode. When a packet of one frame from the AV center (1) is received by the TV (2), a communication between the AV center (1) and the TV (2) is ended.

50 Claims, 26 Drawing Sheets

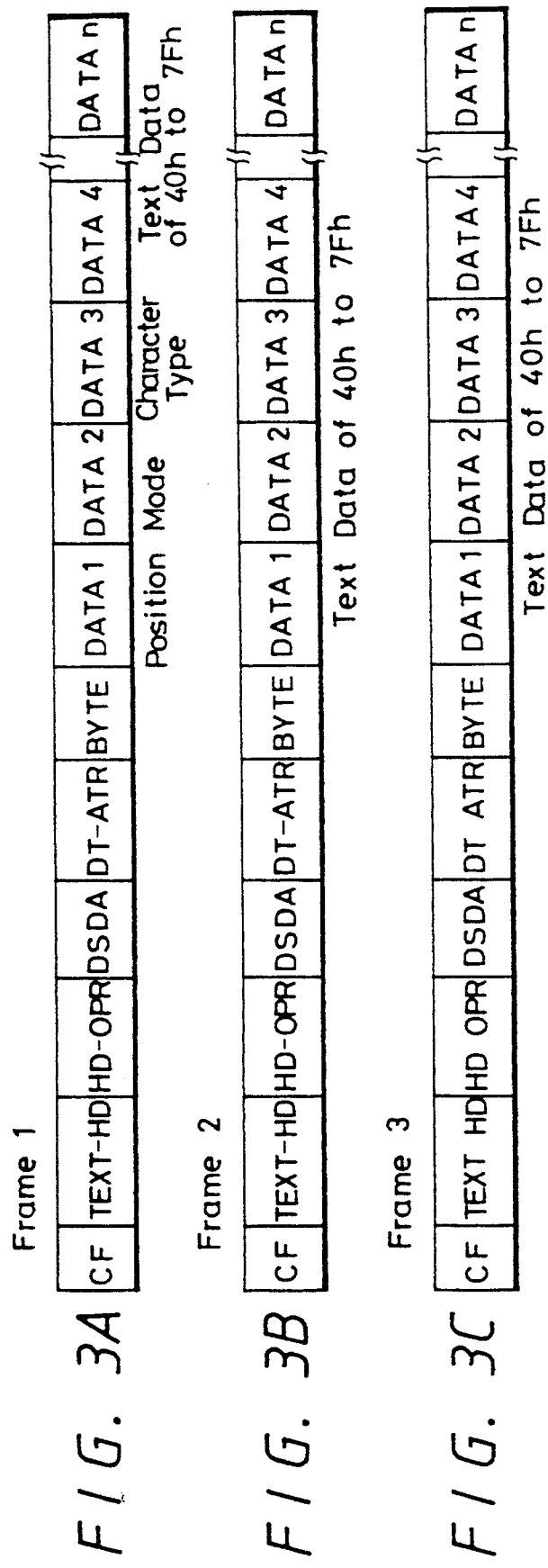

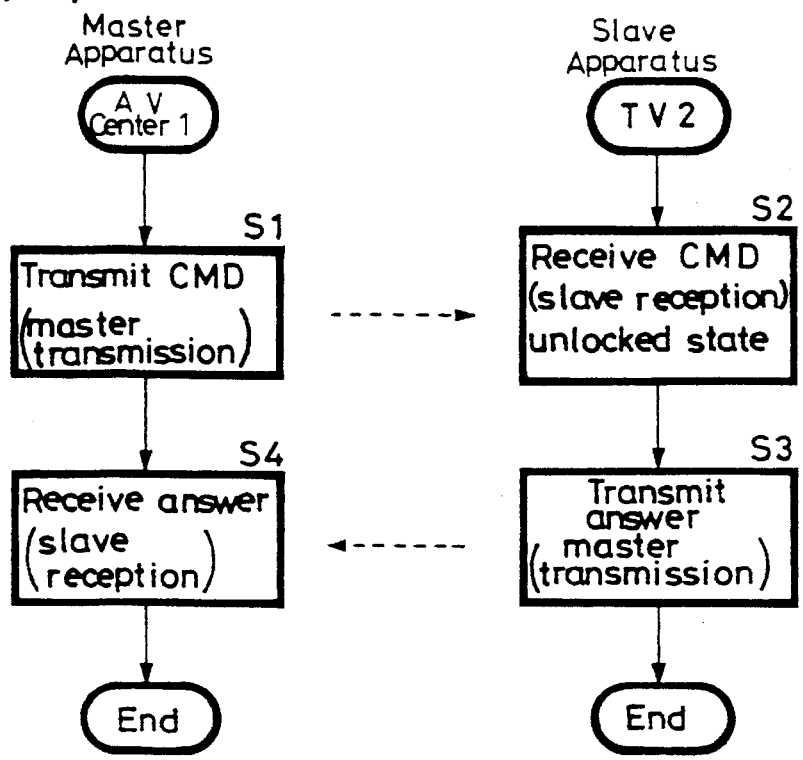
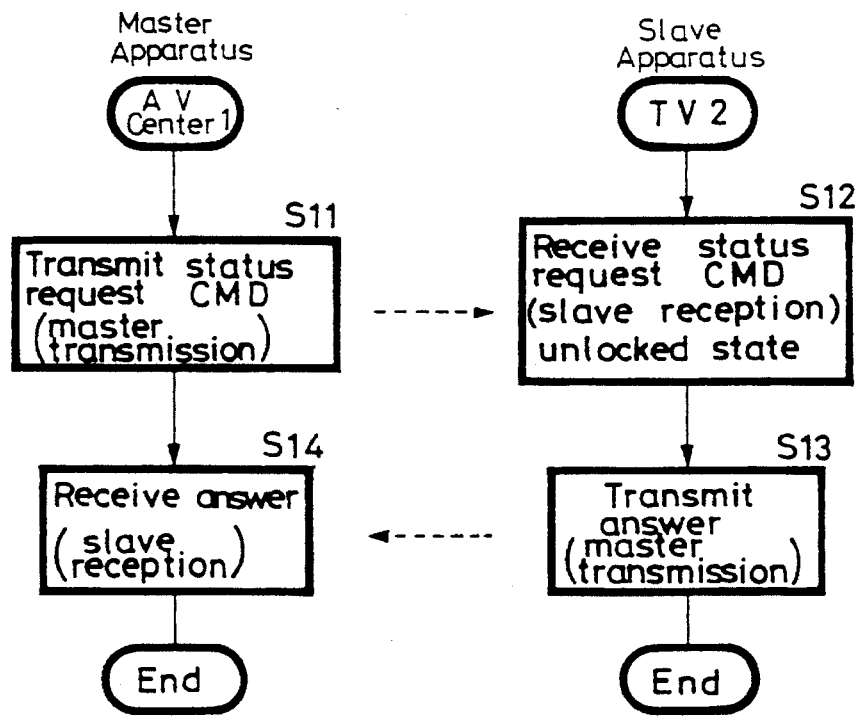

D2B Control Unit 2a

CMD Transmission

REQ/DATAREQ Transmission

FIG. 17

Data Transmission Completed in 1 Frame

| Master Apparatus | Slave Apparatus |
| --- | --- |

Master Transmission ===== Data ===> Slave Reception (Unlock)

FIG. 18

Forming 1 Message by a Plurality of Frames

| Master Apparatus | Slave Apparatus |
| --- | --- |

Master Transmission ===== Data ===> Slave Reception (Lock)
|
Wait for Longer Than 8 ms
|
Master Transmission ===== Data ===> Slave Reception (Lock)
|
Wait for Longer Than 8 ms
|
Master Transmission ===== Data ===> Slave Reception (UnLock)

FIG. 19

Answer "ANS"

| Slave Apparatus | Master Apparatus |
| --- | --- |

Master Transmission ===== ANS ===> Slave Reception (Unlock)

"Automatic Transmission" Transmission

Transmission Error Occurred When Transmission to Destination Address, Control Bit Is Effected (Transmission Error Is Detected by Counting The Number of Signal ACK on Transmission Side)

Transmission Frame Is Concerned With Frame Transmission of Command/REQ/DATAREQ/DATA/ANS/Automatic Transmission Transmission Error (Text Data Portion Following Control Bit Cannot be Transmitted Correctly)
(Transmission Error is Detected by Counting the Number of Signals ACK on the Basis of Content of ANS Packet From Reception Side on Transmission Side)
CMD/REQ/DATAREQ
When Answer of Slave Apparatus For Transmitted CMD/REQ/DATAREQ is Illegal

FIG. 23
No Answer for 200ms After CMD/REQ/DATAREQ Was Transmitted

| Transmission Side | Reception Side |
|---|---|

```
Master Transmission ===CMD/REQ/DATAREQ==> Slave Reception (Unlock)
(Transmission Error)
    |
  Wait for 200ms
    |
Master Transmission ===CMD/REQ/DATAREQ==> Slave Reception (Unlock)
(Transmission Error)
    |
  Wait for 200ms
    |
Master Transmission ===CMD/REQ/DATAREQ==> Slave Reception (Unlock)
(Transmission Error)
    |
  Wait for 200ms
    |
Master Transmission ===CMD/REQ/DATAREQ==> Slave Reception (Unlock)
(Transmission Error)
  Give Up (After Three
          Re-Transmissions
          At Maximum)
```

FIG. 24
Text Portion is not Correctly Transmitted When "Data" is Transmitted

| Transmission Side | Reception Side |
|---|---|

```
Master Transmission===== Data =====> Slave Reception
(Transmission Error)
    |
  Wait for Longer Than 8 ms
    |
Master Transmission===== Data =====> Slave Reception
(Transmission Error)
    |
  Wait for Longer Than 8 ms
    |
Master Transmission===== Data =====> Slave Reception
(Transmission Error)
    |
  Wait for Longer Than 8 ms
    |
Master Transmission===== Data =====> Slave Reception
(Transmission Error)
  Give Up (After Three
          Re-Transmission
          At Maximum)
```

Text Portion is not Correctly Transmitted When ANS / Automatic Transmission is Transmitted (Error is Detected By Counting the Number of Signals ACK)

Answer Is Not Normal While Transmission Is Ended Normally in The Case of CMD/REQ/DATAREQ Answer Is Illegal When CMD/REQ/DATAREQ Is Transmitted No Answer for 200 ms After CMD/REQ/DATAREQ is Transmitted

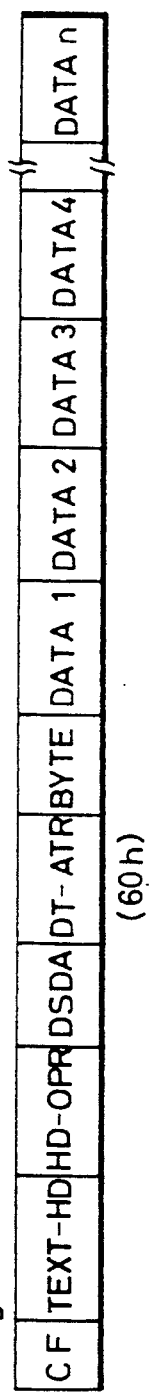
FIG. 33A Right Frame 1 | CF | TEXT-HD | HD-OPR | DSDA | DT-ATR | BYTE | DATA 1 | DATA 2 | DATA 3 | DATA 4 | ... | DATA n | (60h)
FIG. 33B Substitute Frame 1 | CF | TEXT-HD | HD-OPR | DSDA | DT-ATR | BYTE | DATA 1 | DATA 2 | DATA 3 | DATA 4 | ... | DATA n | (61h)
FIG. 33C Right Frame 2 | CF | TEXT-HD | HD-OPR | DSDA | DT-ATR | BYTE | DATA 1 | DATA 2 | DATA 3 | DATA 4 | ... | DATA n | (62h)
FIG. 33D Substitute Frame 2 | CF | TEXT-HD | HD-OPR | DSDA | DT-ATR | BYTE | DATA 1 | DATA 2 | DATA 3 | DATA 4 | ... | DATA n | (63h)

COMMUNICATION PROTOCOL FOR COMMUNICATING IMAGE DATA

The present invention relates to a communication protocol for use in communication among AV (audio-video) equipments, communication among computers and communication among AV equipments and computers, for example.

It is customary that the AV system is formed of a plurality of AV equipments, such as a TV (television receiver), an MDP (multi-media player), a VTR (video tape recorder), an AV center (switcher) or the like.

In the AV system, a plurality of AV equipments, such as TV, MDP, VTR and AV center, are connected together by means of video signal lines, audio signal lines and control signal lines (control buses). A variety of control signals and data (e.g., packets of predetermined formats) are supplied to the AV equipments via the control buses, whereby the respective AV equipments are operated in a ganged fashion.

Specifically, according to the AV system, when a play button of the VTR is operated, a packet is output to the TV and the AV center from the VTR, whereby the TV and the AV center are powered. Further, the AV center is switched such that the VTR and the TV are connected together, and image and sound reproduced by the VTR are output from the VTR.

The packets are communicated in the following procedure:

(T1) Routing information transmission
(T2) Command (CMD) transmission
(T3) Request (REQ) transmission
(T4) Get answer (GET-ANS) transmission→answer (ANS) reception
(T5) End (END) transmission Initially, an AV equipment which transmits a packet first is set to "master apparatus" and an AV equipment which receives such packet is set to "slave apparatus". Routing information is transmitted from the master apparatus to the slave apparatus (T1). At that time, the slave apparatus is locked so that it is inhibited from receiving a packet transmitted from other AV equipment.

Then, a command (CMD) which turns on the power supply is transmitted from the master apparatus to the slave apparatus (T2). A request (REQ) which solicits the processing of the command is further transmitted from the master apparatus to the slave apparatus (T3).

Then, in order to obtain an answer (ANS) for REQ, the get answer (GET-ANS) is transmitted from the master apparatus to the slave apparatus (T4). The GET-ANS is repeatedly transmitted until the answer ANS is obtained from the slave apparatus. When the answer (ANS) is obtained from the slave apparatus, an end (END) representing the end of the processing is transmitted (T5). At that time, the slave apparatus which is set in the locked state is set in the unlock state. Therefore, the slave apparatus is set in a state that it can again receive a packet transmitted from the AV equipment.

As described above, the packet exchange procedure in the conventional AV system is cumbersome.

Since the GET-ANS is repeatedly transmitted until the answer ANS is obtained from the slave apparatus, the traffic on the control bus is increased. Furthermore, it is frequently observed that other AV equipments cannot use the control bus. There is then the problem that the overall processing speed of the system is lowered.

When a packet is transmitted from the master apparatus to the slave apparatus, for example, the CMD transmission and the REQ transmission, the communication mode of the master apparatus is set in the master communication mode, and the communication mode of the slave apparatus is set in the slave reception mode. If on the other hand a packet is expected to be transmitted from the slave apparatus to the master apparatus, such as when the master apparatus does not receive the answer (ANS) from the slave apparatus, and therefore issues the GET-ANS, the communication mode of the master apparatus is set in the master reception mode and the communication mode of the slave apparatus is set in the slave transmission mode.

As described above, there are four communication modes such as the master transmission mode, the master reception mode, the slave transmission mode and the slave reception mode. Therefore, each AV equipment must exchange a packet by switching the four modes and a communication efficiency is low.

Further, each AV equipment needs four buffers including a master transmission buffer for latching a packet transmitted in the master transmission mode, a master reception buffer for latching a packet received in the master reception mode, a slave transmission buffer for latching a packet transmitted in the slave transmission mode and a slave reception buffer for latching a packet received in the slave reception mode. There is then the problem that the apparatus becomes large in size and expensive.

Furthermore, since the reception side cannot recognize a transmission error, there is then the problem that an error recovery processing required when a transmission error occurs becomes complex.

In addition, date of 3 frames must be transmitted at minimum in order to transmit pure data, e.g., OSD data. There is then the problem that a lot of time must be prepared and that the processing becomes complex.

SUMMARY OF THE INVENTION

In view of the aforesaid aspect, an object of the present invention is to provide a communication protocol for communicating data in which a communication can be efficiently made by a simple procedure.

According to a first aspect of the present invention, there is provided a communication protocol for communicating data by a serial format which is comprised of a command packet informing an operation command, a status request packet informing a status request of some apparatus, a data request packet informing a data request to some apparatus, a datum packet informing data, an answer packet informing answer datum for previous request, an automatic status sending packet informing a status of an apparatus, and a simulcast packet informing simulcast datum for a plurality of apparatus.

According to a second aspect of the present invention, there is provided a communication system for communicating data which is comprised of a command packet communicating member for communicating a command packet, a status request packet communicating member for communicating a status request packet. a data request packet communicating member for communicating a data request packet, a datum packet communicating member for communicating a datum packet, an answer packet communicating member for communicating an answer packet, an automatic status sending packet communicating member for communicating an automatic status sending packet, and a simulcast packet communicating member for communicating a simulcast packet.

In accordance with a third aspect of the present invention, there is provided a communication system for communicating data which is comprised of a master apparatus which comprises a command packet communicating member for communicating a command packet, a status request communicating member for communicating a status request packet, a data request packet communicating member for communicating a data request packet, a datum packet communicating member for communicating a datum packet, an answer packet communicating member for communicating an answer packet, an automatic status packet communicating member for communicating an automatic status sending packet, and a simulcast packet communicating member for communicating a simulcast packet, and a slave apparatus which comprises a command packet communicating member for communicating a command packet, a status request packet communicating member for communicating a status request packet, a data request packet communicating member for communicating a data request packet, a datum packet communicating member for communicating a datum packet, an answer packet communicating member for communicating an answer packet, an automatic status sending packet communicating member for communicating an automatic status sending packet, and a simulcast packet communicating member for communicating a simulcast packet.

BRIEF DESCRIPTION OF THE DRAWINGS

FIGS. 3A through 3C are diagrams showing a format of OSD data formed of a plurality of frames transmitted and received in the AV system shown in FIG. 1, respectively;

FIG. 4 is a flowchart to which reference will be made in explaining a communication procedure of a CMD packet;

FIG. 5 is a flowchart to which reference will be made in explaining a communication procedure of a REQ packet;

FIG. 17 is a diagram used to explain a communication procedure of a DATA packet formed of one frame;

FIG. 18 is a diagram used to explain a communication procedure of a DATA packet formed of a plurality of frames;

FIG. 19 is a diagram used to explain a communication procedure of an ANS packet;

FIGS. 21 to 25 are respectively diagrams used to explain a recovery procedure executed when an transmission error occurred;

FIGS. 33A through 33D are diagrams showing right formats and substitute formats used when OSD data is transmitted twice, respectively.

DETAILED DESCRIPTION OF THE PREFERRED EMBODIMENT

The present invention will now be described with reference to the drawings.

Figure 1:
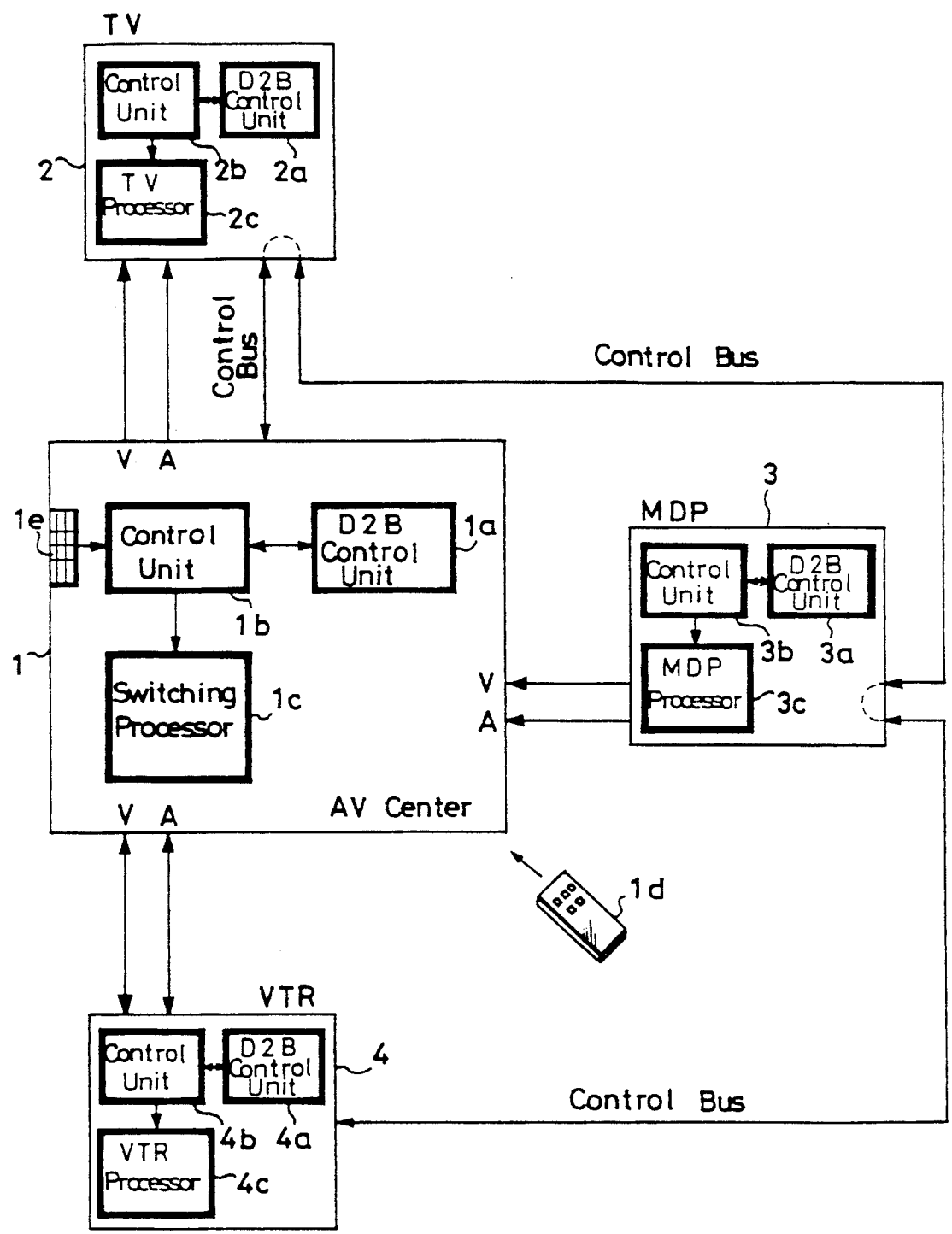
FIG. 1 is a block diagram showing an arrangement of an embodiment of an AV (audio-video) system to which the present invention is applied.

FIG. 1 of the accompanying drawings shows in block form an arrangement of an embodiment of an AV system to which the present invention is applied. As shown in FIG. 1, this AV system comprises an AV center 1, a TV (television receiver) 2, an MDP (multi-disk player) 3 and a VTR (video tape recorder) 4. Video and audio terminals of the AV center 1 are connected to video and audio terminals of the TV 2, the MDP 3 or the VTR 4. The AV center 1, the TV 2, the MDP 3 and the VTR 4 are connected in cascade through control terminals by control buses. The AV center 1 comprises a D2B (registered trademark) control unit 1a, a control unit 1b and a switching processor 1c and includes video and audio output terminals of a predetermined number. In the embodiment of the present invention, a control unit of the AV center 1, the TV2, the MDP 3 and the VTR 4 is not limited to the above D2B control unit and other bus control units may be applied to the present invention. Specifically, any serial bus can be used in the present invention. Moreover, the present invention is not limited to the bus and may be applied to a variety of communications which effect a serial transmission. The switching processing circuit 1c is controlled by the control unit 1b to change-over (switching) the connection of the video terminals (audio terminals) so that a video signal (audio signal) input through a certain video terminal (audio terminal) is output through another video terminal (audio terminal).

The control unit 1b controls the switching processor 1c in response to a control signal output from the D2B control unit 1a or operation of a remote controller 1d or operation key 1e. The D2B control unit 1a controls communication among the AV center 1 and the TV 2, the MDP 3 and the VTR 4 connected in cascade via the control bus.

The TV 2 comprises a D2B control unit 2a, a control unit 2b and a TV processor circuit 2c. The TV processor circuit 2c incorporates therein a tuner and a signal processor and allows a video signal input thereto from the tuner or the video terminal or OSD data transmitted thereto through the control bus to be displayed on a monitor (not shown) under the control of the control unit 2b. The TV processor circuit 2c outputs the input audio signal to the tuner or the audio terminal of a speaker (not shown).

The control unit 2b controls the TV processor 2c in response to the control signal output from the D2B control unit 2a or operation of a remote controller or an operation key (not shown). The D2B control unit 2a controls communication among the AV center 1, the MDP 3 and the VTR 4 connected in cascade through the control bus.

The MDP 3 comprises a D2B control unit 3a, a control unit 3b and an MDP processor 3c. The MDP processor 3c incorporates therein an optical head and a demodulator, though not shown, to reproduce a video signal and an audio signal from a CD (compact disc) and a LD (laser disk), and outputs a reproduced video signal and a reproduced audio signal from the video terminal and the audio terminal, respective.

The control unit 3b controls the MDP processor 3c in response to the control signal output from the D2B control unit 3a or operation of a remote controller (not shown) or an operation key (not shown). The D2B control unit 3a controls communication among the AV center 1, the TV 2 and the VTR 4 connected in cascade to the MDP 3.

The VTR 4 comprises a D2B control unit 4a, a control unit 4b and a VTR processor 4c. The VTR processor 4c incorporates a magnetic head and a MODEM circuit, though not shown, to reproduce a video signal and an audio signal from a video tape under the control of the control unit 4b, and outputs a reproduced video signal and a reproduced audio signal from the video terminal and the audio terminal, respective. The VTR processor 4c records on a video tape (not shown) video and audio signals input thereto from the video and audio terminals respective, or OSD data transmitted thereto through the control bus or the like.

A control unit 4b controls the VTR processor 4c in response to the control signal output from the D2B control unit 4a or operation of a remote controller (not shown) or an operation key. The D2B control unit 4a controls communication among the AV center 1, the TV 2 and the MDP 3 connected to the VTR 4 in cascade by means of the control bus.

In the AV system thus arranged, packets (telegraphic messages) are exchanged among the AV center 1, the TV 2, the MDP 3 or the VTR 4 through the control buses as various control signals and data, whereby the AV center 1, the TV 2, the MDP 3 or the VTR 4 are operated in a ganged fashion.

When the play button of the VTR 4, for example, is operated, the VTR processor 4c starts reproducing the video tape so that a video signal and an audio signal are respectively output from a video terminal and an audio terminal and that a control signal indicating that the play button of the VTR 4 was operated is supplied from the control unit 4b to the D2B control unit 4a.

When the D2B control unit 4a receives this control signal, the D2B control unit 4a outputs a packet instructing that the power switch should be turned on and that the video and audio terminals of the VTR 4 and the video and audio terminals of the TV 2 are respectively connected together to the AV center 1 through the control bus. Also, the D2B control unit 4a outputs a packet instructing that the power switch should be turned on and that the input video and audio signals are respectively output of the monitor and the speaker to the TV 2 through the control bus.

When the D2B control unit 1a of the AV center 1 and the D2B control unit 2a of the TV 2 receive these packets, in the AV center 1, the control signal is supplied from the D2B control unit 12a to the control unit 1b, whereby the power switch of the AV center 1 is turned on and the switching processor 1c performs the switching so that the video and audio terminals of to the VTR 4 and the video and audio terminals of to the TV 2 are connected together.

Simultaneously, in the TV 2, the D2B control unit 2a outputs a control signal to the control unit 2b, whereby the power switch of the TV 2 is turned on and image and sound corresponding to video and audio signals input thereto from the video and audio terminals are respectively output from the monitor and the speaker (not shown) by means of the TV processor 2c.

As described above, the video signal and the audio signal are reproduced only by operating the play button of the VTR 4 and the corresponding image and sound are respectively output from the monitor and the speaker (not shown) without operating the AV center 1 and the TV 2.

Identification (ID) addresses of packet transmission destination and packet reception destination are previously assigned to the respective AV equipments (D2B control unit 1a of the AV center 1, the D2B control unit 2a of the TV 2, the D2B control unit 3a of the MDP 3 and the D2B control unit 4a of the VTR 4). While packets are communicated by amongst the four communication modes including the master transmission, the master reception, the slave transmission and the slave reception in the prior art, according to the present invention, packets are communicated by using two communication modes of the master transmission (MASTER transmission) and the slave reception (SLAVE reception) as will be described later on.

A communication procedure of packets (telegraphic messages) communicated from the D2B control unit 1a to the D2B control unit 4a in this AV system will be described below. In this AV system, there are provided 7 types of packets, i.e., a command (CMD) packet, a status request command (REQ) packet, a data request command (DATAREQ) packet, a pure data transmission (DATA) packet, an answer (ANS) packet, an automatic status sending packet and a simulcast packet.

The command (CMD) packet is used to instruct a predetermined processing (e.g., turning on and off a power switch, etc.) to a corresponding AV equipment. The status request command (REQ) packet is used to inquire an AV equipment the status of the AV equipment. The data request command (DATAREQ) command is used to obtain information (e.g., name of corresponding AV equipment, channel number, etc.) of the corresponding AV equipment. The pure data transmission (DATA) packet is used to transmit pure data (e.g., OSD (on-screen display) data, etc.) to the corresponding AV equipment.

The answer (ANS) packet is used to transmit an answer to a request packet (e.g., REQ packet, etc.) when such request packet is received. The automatic status sending packet is used to inform an AV equipment the status of the AV system voluntarily. The simulcast packet is used to transmit the same information to a plurality of AV equipments.

The CMD packet, the REQ packet, the DATAREQ packet and the automatic status sending packet are classified as packets. The DATA packet is classified as the packet.

The 6 packets except the DATA packet are each formed of one frame (one packet). The DATA packet is fundamentally formed of one frame (one packet). When long data such as the OSD data or the like is transmitted, a plurality of frames (a plurality of packets) (e.g., 4 frames (packets)) formed as one unit.

The packets other than the simulcast packet are transmitted to one AV equipment. Specifically, the CMD packet, the REQ packet, the DATAREQ packet, the DATA packet, the ANS packet and the automatic status sending packet cannot be transmitted to a plurality of AV equipments one at a time. When the same packet is transmitted to a plurality of AV equipments one at a time, such packet is transmitted in the form of the simulcast packet. Therefore, the simulcast packet is itself a CMS packet, REQ packet, DATAREQ packet, DATA packet, ANS packet or automatic status sending packet transmitted to a plurality of AV equipments one at a time.

Figures 2A, 2B:
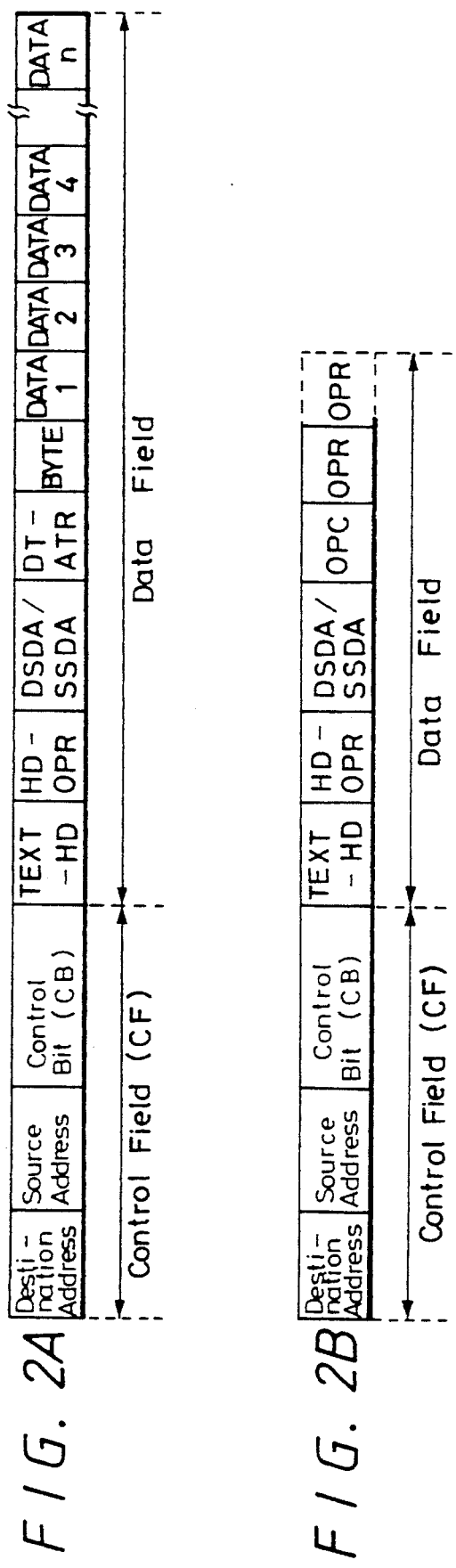
FIGS. 2A and 2B are diagrams showing formats of packets transmitted and received in the AV system shown in FIG. 1, respectively.

Of the above-mentioned packets, the DATA packet is arranged as shown in FIG. 2A, and other packets are arranged as shown in FIG. 2B. The CMD packet, the REQ packet, the DATAREQ packet, the ANS packet, the automatic status sending packet and the simulcast packet (FIG. 2B) are different from the DATA packet only in that an operation code (OPC) is described instead of the data attribute signal DT-ATR of the DATA packet (FIG. 2A) and that an operand OPR is described instead of BYTE (data count) and DATA1 through DATAn.

As shown in FIGS. 2A and 2B, an ID address of the destination AV equipment to which the packet is transmitted is described in the destination address, and an ID address of the AV equipment which transmits this packet is described in the source address. Information which locks or unlocks the destination AV equipment to which the packet is transmitted and information which represents whether this packet is pure data packet or not are described in the control bit (CB).

During a locked state, only a packet transmitted from a locked AV equipment is received but packets transmitted from other AV equipments are not received. During an unlocked state packets transmitted from respective AV equipment can be received.

The destination address, its own address and the control bit (CB) constitute a header portion (control field) (CF) of the packet.

A portion which follows the control field (CF) constructs a text portion (data field) and may be 16 bytes, for example, at maximum in the case of OSD data. In this text portion, TEXT-HD depicts a header of the text portion in which information which can identify the format of the packet (frame) is described. HD-OPR indicates that this packet is specific one of the CMD packet, the REQ packet, the DATAREQ packet, the DATA packet, the ANS packet, the automatic status sending packet and the simulcast packet. In DSDA/SSDA, there is described an identification address of a source sub-device or a destination sub-device.

The identification address of the sub-device is an identification address assigned one of respective blocks constructing the AV equipment.

DT-ATR (FIG. 2A) describes the kind of data (e.g., OSD data, transparent data, remote control data, etc.) in DATA1 through DATAn. BYTE describes a byte count of data in DATA1 through DATAn. In DATA1 through DATAn, there are described data. The transparent data is the data which is not defined particularly. All codes from 00h to FFh can be described in DATA1 through DATAn.

An operation code (command code) is described in OPC (FIG. 2B) and an operand is described in OPR.

In the AV equipment which transmits the DATA packet shown in FIG. 2A, when there is transmission data which cannot be accommodated within one packet, such data is dispersed into a plurality of DATA packets and then transmitted.

FIGS. 3A through 3C are diagrams showing frame formats of OSD data formed of three frames (packets), for example. In FIGS. 3A to 3C, CF depicts a control field, BYTE depicts the number of data following DATA1, and DATA1, DATA2, . . . , DATAn depict data.

Data following the DATA4 of the frame 1 shown in FIG. 3A is OSD data. DATA1 through DATA3 following BYTE represent attribute information for the OSD data following DATA4, such as display position, display mode and display character type. The attribute information is described by a value smaller than 40h, for example.

Specifically, when a value smaller than 40h, for example, is described in the DATA1 of the OSD data frame, the OSD data frame is defined as an OSD data frame including the attribute information.

When a value larger than 40h, for example, is described in DATA1 of the frame 2 shown in FIG. 3B, if the succeeding data are all defined as OSD data, then attribute data described in DATA1 to DATA 3 of the frame 1 shown in FIG. 3A can be continuously applied to the OSD data. If text data of 40h or greater exists in DATA1, then attribute data described in the frame 1 shown in FIG. 3A can continuously be applied to the OSD data following the DATA1 of the frame 3 shown in FIG. 3C, similarly. Text data may be described by a value ranging from 40h to 7Fh, for example.

The AV equipment which receives the DATA packet can determine on the basis of BYTE (FIG. 2A) whether or not the DATA packet is received correctly.

Specifically, the number of data described at BYTE position of the received packet and the number of data actually received are compared with each other. If both of them are equal, then it can be determined that the DATA packet is received correctly.

As shown in FIG. 2A or FIG. 2B, the data frame and the command frame are similar in arrangement from TEXT-HD to DSDA/SSDA, and DT-ATR of data frame and OPC of command frame are described at positions of the same bytes from the start of each frame. Therefore, even when the received frame is either the data frame or the command frame, a similar processing is carried out up to DSDA/SSDA of the received frame. It can be determined on the basis of data next to DSDA/SSDA whether the received frame is the data frame or the command frame.

The above-mentioned 7 packets are fundamentally communicated among the respective AV equipments as follows.

When the CMD packet is transmitted from the AV center 1 to the TV 2 to start the communication, as shown in a flowchart of FIG. 4, in step S1, the AV center 1 (D2B control unit 1a) is set as the master apparatus and its communication mode is set to the master transmission (MASTER transmission) mode, whereby the CMD packet is transmitted to the TV 2.

In step S2, the TV 2 (D2B control unit 2a) is set as the slave apparatus and its communication mode is set to the slave reception (SLAVE reception) mode, whereby the CMD packet transmitted from the AV center 1 is received by the TV 2.

As described above, when the CMD packet is transmitted from the AV center 1, if the transmitted CMD packet is received by the TV 2, then the transmission and reception of the CMD packet, i.e., communication between the AV center 1 and the TV 2 is completed.

At that time, the CMD packet transmitted from the AV center 1 is only one frame and the TV 2 is not set in the locked state. In other words, the TV 2 is set in the unlocked state even when receiving the CMD packet.

Thereafter, the TV 2 effects the processing corresponding to the command (OPC/OPR (FIG. 2B)) described in the CMD packet. In step S3, the ANS (answer) packet in which a code COMPLETED representing the completion of the processing is described is returned (transmitted) to the AV center 1 which transmitted the CMD packet.

At that time, although the TV 2 is the slave apparatus, its communication mode is set to the master transmission mode.

In step S4, although the AV center 1 is the master apparatus, its communication mode is set to the slave reception mode to receive the ANS packet transmitted from the TV 2.

As described above, when the ANS packet is transmitted from the TV 2 to the AV center 1, if the ANS packet thus transmitted is received by the AV center 1, the transmission and reception of the ANS packet, i.e., communication between the AV center 1 and the TV 2 is completed.

According to this embodiment, any one of five REJECT, NOT-IMPLEMENT, ILLEGAL+NOT–IMPL, BUSY and COMPLETED is described in the ANS packet. The REJECT is described in the ANS packet when the AV equipment which transmits the ANS packet cannot execute the requested processing at present. The NOT-IMPLEMENT is described in the ANS packet when the above AV equipment is unable to implement the requested processing. The ILLEGAL+NOT–IMPL is described in the ANS packet when the above AV equipment can not understand the request processing because of grammatical error occurred in the description of the packet. The BUSY is described in the ANS packet when the above AV equipment is now busy in implementing the requested processing. The COMPLETED is described in the ANS packet when the above AV equipment normally completes the requested processing.

When the REQ packet is transmitted from the AV center 1, for example, to the TV 2, as shown in a flowchart of FIG. 5, in step S11, the AV center 1 is set as the slave apparatus and its communication mode is set in the master transmission mode, whereby the REQ packet is transmitted to the TV 2.

In step S12, the TV 2 is set as the slave apparatus and its communication mode is set to the slave reception mode, whereby the REQ packet transmitted from the AV center 1 is received by the TV 2 and the transmission and reception of the REQ packet, i.e., communication between the AV center 1 and the TV 2 is completed.

At that time, the REQ packet transmitted from the AV center 1 is only one frame and the TV 2 is not set in the locked state. In other words, even though the TV 2 receives the REQ packet, the TV 2 is left in the unlocked state.

Thereafter, in step S13, the state (status) of the TV 2 is described in the ANS (answer) packet and the TV 2 returns (transmits) this ANS packet to the AV center 1 which transmitted the REQ packet.

At that time, although the TV 2 is the slave apparatus, its communication mode is set to the master transmission mode.

In step S14, although the AV center 1 is the master apparatus, its communication mode is set to the slave reception mode, and the AV center 1 receives the ANS packet transmitted from the TV 2. Thus, the communication of the ANS packet is completed.

Processing executed by the TV 2 (reception side) when a DATA packet in which the OSD data or the like is described is transmitted from the AV center 1 to the TV 2 to start the communication will be described with reference to FIG. 6.

Figure 6:
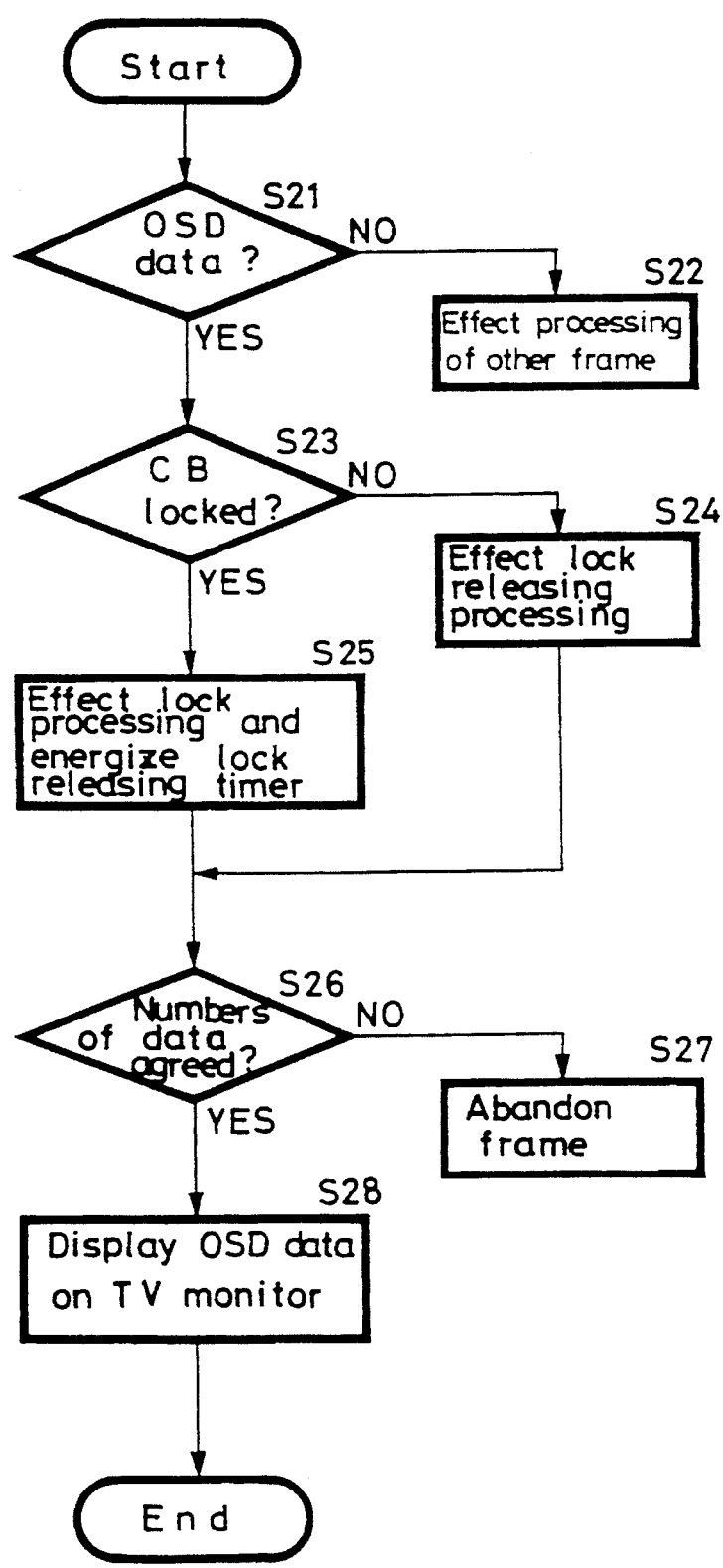
FIG. 6 is a flowchart to which reference will be made in explaining a processing procedure executed on the transmission side when a DATA packet in which OSD data, etc. are described is received.

As shown in a flowchart of FIG. 6, following the start of operation, it is determined in decision step S21 by the reception side (TV 2) whether the transmitted frame is an OSD data frame or not. This decision can be made on the basis of the data attribute data DT-ATR (FIG. 2A). If the transmitted frame is not the OSD data frame as represented by a NO at decision step S21, then the processing proceeds to step S22, in which the processing proceeds to a processing routine of another frame.

If the transmitted frame is the OSD data frame as represented by a YES at decision step S21, then the processing proceeds to the next decision step S23. It is determined in decision step S23 whether the control bit (CB) provided within the transmitted frame indicates a lock designation or unlock designation. If the control bit (CB) indicates the unlock designation as represented by a NO at decision step S23, then the processing proceeds to step S24. In step S24, the lock releasing processing (unlock processing) is executed and then the processing proceeds to decision step S26.

If the control bit (CB) provided within the transmitted frame indicates the lock designation as represented by a YES at decision step S23, then the processing proceeds to the next step S25. In step S25, the lock processing is executed and a timer, for example, is energized in order to effect the lock releasing processing after a predetermined period of time is counted, whereafter the processing proceeds to decision step S26.

In decision step S26, the number of data indicated by the byte count BYTE (FIG. 2A) provided within the transmitted frame is read out and compared with the number of data which are actually received. If the two numbers are not consistent as represented by a NO at decision step S26, then the processing proceeds to step S27, wherein data of the transmitted frame is thrown away.

If the number of data indicated by the byte count BYTE provided within the transmitted frame and the number of data actually received are consistent as represented by a YES at decision step S26, then the processing proceeds to step S28. In step S28, the OSD data provided within the frame is transmitted to the TV processor 2c of the TV 2 and displayed on the monitor display (not shown).

In step S26, information stored at the position shown by the BYTE of the frame of the format shown in FIG. 2A, for example, is read out as the number of data included within the frame. Then, it is determined by comparing the above-mentioned information representative of the number of data with the number of data following the BYTE transmitted actually whether or not the received frame is correct, or the received frame data should be thrown away.

On the other hand, the transmission side compares the number of signals ACK of every byte of the transmission frame (acknowledge signal (acknowledge) transmitted to the transmission side each time the reception side receives 1-byte data) and the byte number of the frame actually transmitted. If it is determined on the basis of the compared result that a transmission error occurs, then the transmission side transmits the frame one more time. The reception side can recognize the transmission error as mentioned before so that, after the transmission side recognizes the transmission error and retransmits the frame, the reception side can process the re-transmitted data frame as the frame re-transmitted.

Figure 7:
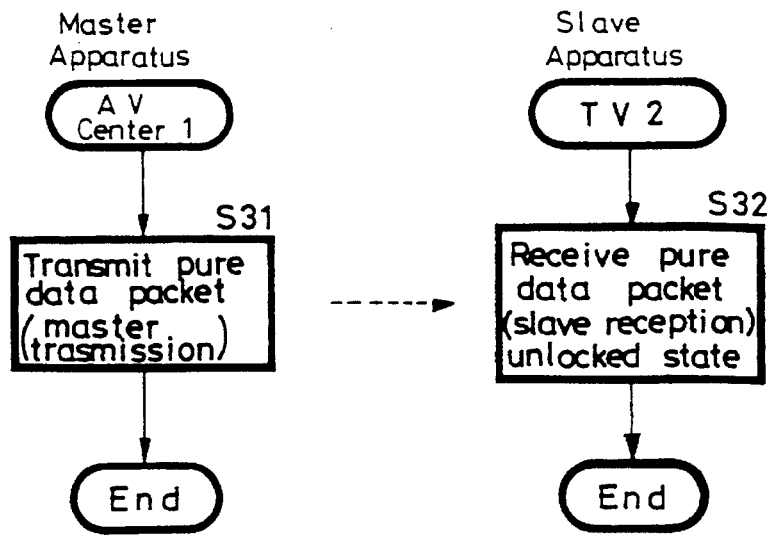
FIG. 7 is a flowchart to which reference will be made in explaining a communication procedure of a DATA packet formed of one frame.

When the AV center 1, for example, transmits the DATA packet in which a useful message (data) of one frame is described to the TV 2 to thereby start the communication, as shown in flowchart of FIG. 7, in step S31, the AV center 1 is set as the master apparatus and its communication mode is set to the master transmission mode, whereby the DATA packet is transmitted to the TV 2.

In step S32, the TV 2 is set as the slave apparatus and its communication mode is set to the slave reception mode, whereby the DATA packet transmitted from the AV center 1 is received by the TV 2. Thus, the transmission and reception of the DATA packet, i.e., communication between the AV center 1 and the TV 2 is completed.

At that time, the DATA packet transmitted from the AV center 1 is only one frame and the TV 2 is not set in the locked state. Specifically, although the TV 2 receives the DATA packet, it is left in the unlocked state.

Figure 8:
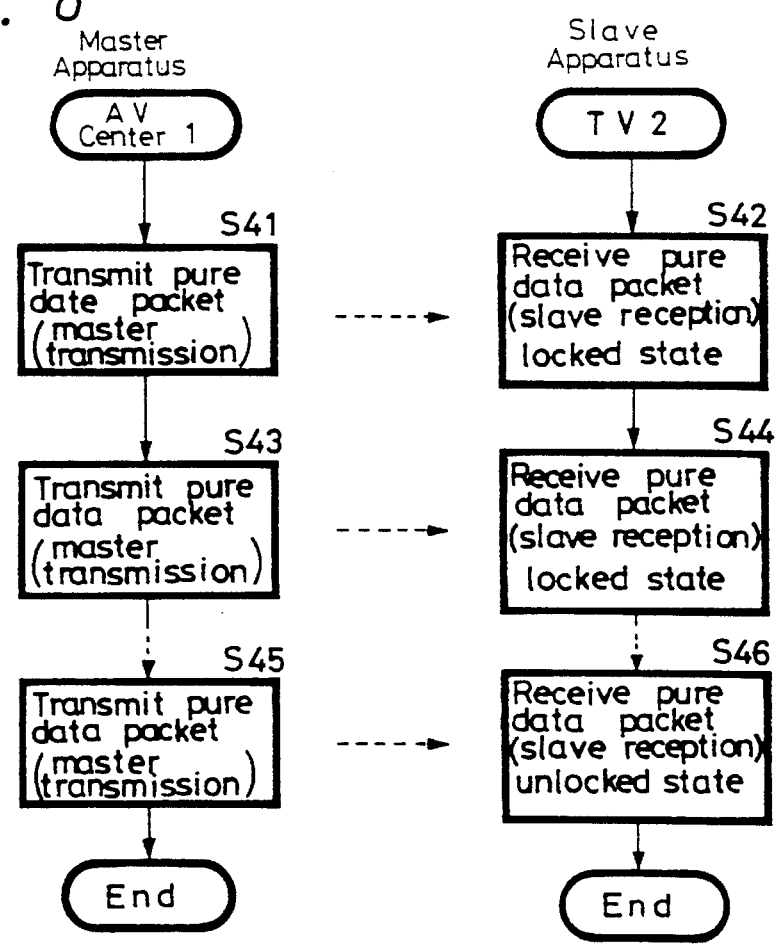
FIG. 8 is a flowchart to which reference will be made in explaining a communication procedure of a DATA packet formed of a plurality of frames.

When the DATA packet in which a useful message (data) is described by a plurality of packets (frames) is transmitted from the AV center 1 to the TV 2, as shown in a flowchart of FIG. 8, as step S41, the AV center 1 is set in the master apparatus and its communication mode is set to the master transmission mode, whereby the first DATA packet is transmitted to the TV 2. In this case, however, the AV center 1 transmits the DATA packet in which the control bit (FIG. 2A) for setting the TV 2 in the locked state is described to the TV 2.

In step S42, the TV 2 is set as the slave apparatus, and its communication mode is set to the slave reception mode, whereby the first DATA packet transmitted from the AV center 1 is received by the TV 2. At that time, since the control bit which sets the TV 2 in the locked state is described in the DATA packet transmitted from the AV center 1, the TV 2 is set in the locked state. Specifically, in this case, the TV 2 is set in the state so that is receives only the packet transmitted from the AV center 1.

In step S43, the AV center 1 implements a processing similar to that of step S41. In step S44, the TV 2 executes a processing similar to that of step S42.

In step S45, the last packet in which the control bit for setting the TV 2 in the unlocked state is described is transmitted from the AV center 1 to the TV 2. In step S46, the last DATA packet is received by the TV 2. At that time, since the control bit of the last DATA packet is described so as to set the TV 2 in the unlocked state, the TV 2 is set in the unlocked state, i.e., in a state that is can receive packets transmitted from other AV equipments.

As described above, when the DATA packet in which the useful message (data) is described by a plurality of packets (frames) is transmitted and received, a communication between the AV center 1 and the TV 2 is completed by performing the transmission/reception of all DATA packets.

Since it is not preferable from a system administration standpoint that the control bus is occupied during a long period of time, the maximum number of the DATA packets that can be transmitted one at a time can be set to 4 frames (packets), for example.

When the message formed of a plurality of frames is received, after all frames constituting the message are received, it is determined whether or not the received messages are received normally. If it is determined that all frames constituting the message are received normally, then a text corresponding to text data in the messages is displayed on the monitor display (not shown) of the TV 2.

As described above, the message reception side needs a buffer memory having a capacity corresponding to the number of frames included in the message. Therefore, if the number of the DATA packets that can be transmitted one at a time is selected to be a predetermined number (e.g., 4 frames (packets)) or smaller, then the capacity of the buffer memory required by the reception side can be reduced, and the arrangements of the equipments on the reception side can be simplified.

Figure 9:
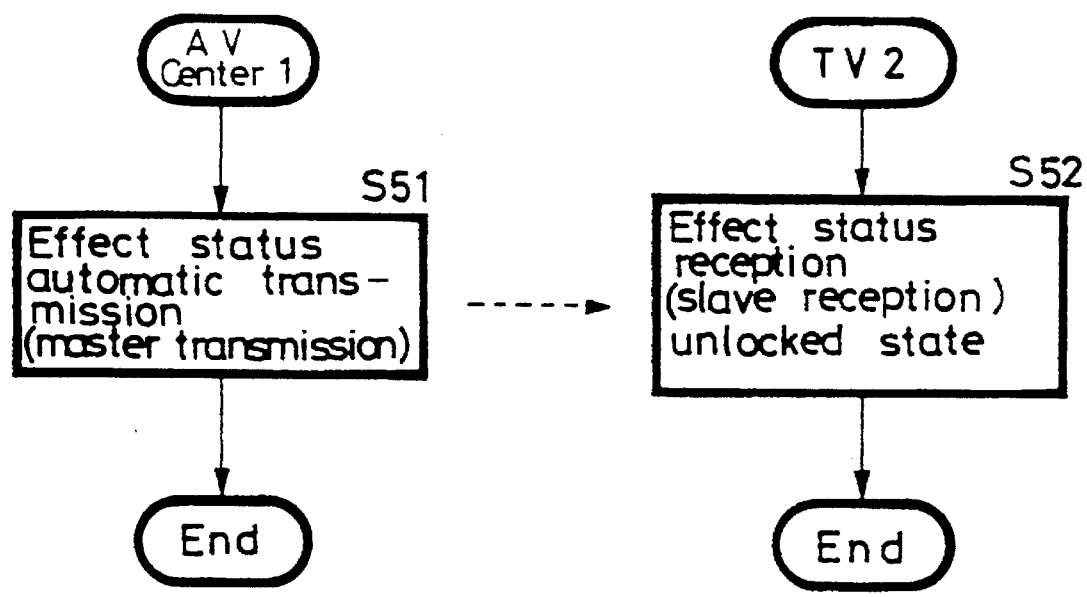
FIG. 9 is a flowchart to which reference will be made in explaining a communication procedure of a status automatic transmission packet.

When the automatic status sending packet is transmitted from the AV center 1 to the TV 2, as shown in a flowchart of FIG. 9, in step S51, the communication mode of the AV center 1 is set to the master transmission mode, and the automatic status sending packet is transmitted to the TV 2. The AV center 1 which transmits the automatic status sending packet is set as the master apparatus or the slave apparatus depending on the described content of the packet. When the AV center 1 is set as the master apparatus, the TV 2 is set as the slave apparatus. When the AV center 1 is set as the slave apparatus, the TV 2 is set as the master apparatus.

In step S52, the communication mode of the TV 2 is set to the slave reception mode and the automatic status sending packet transmitted from the AV center 1 is received by the TV 2. Thus, the transmission and reception of the automatic status sending packet, i.e., communication between the AV center 1 and the TV 2 is completed.

At that time, the automatic status sending packet transmitted from the AV center 1 is only one frame as described above, and the TV 2 is not set in the locked state. In other words, although the TV 2 receives the automatic status sending packet, it is left in the unlocked state.

Figure 10:
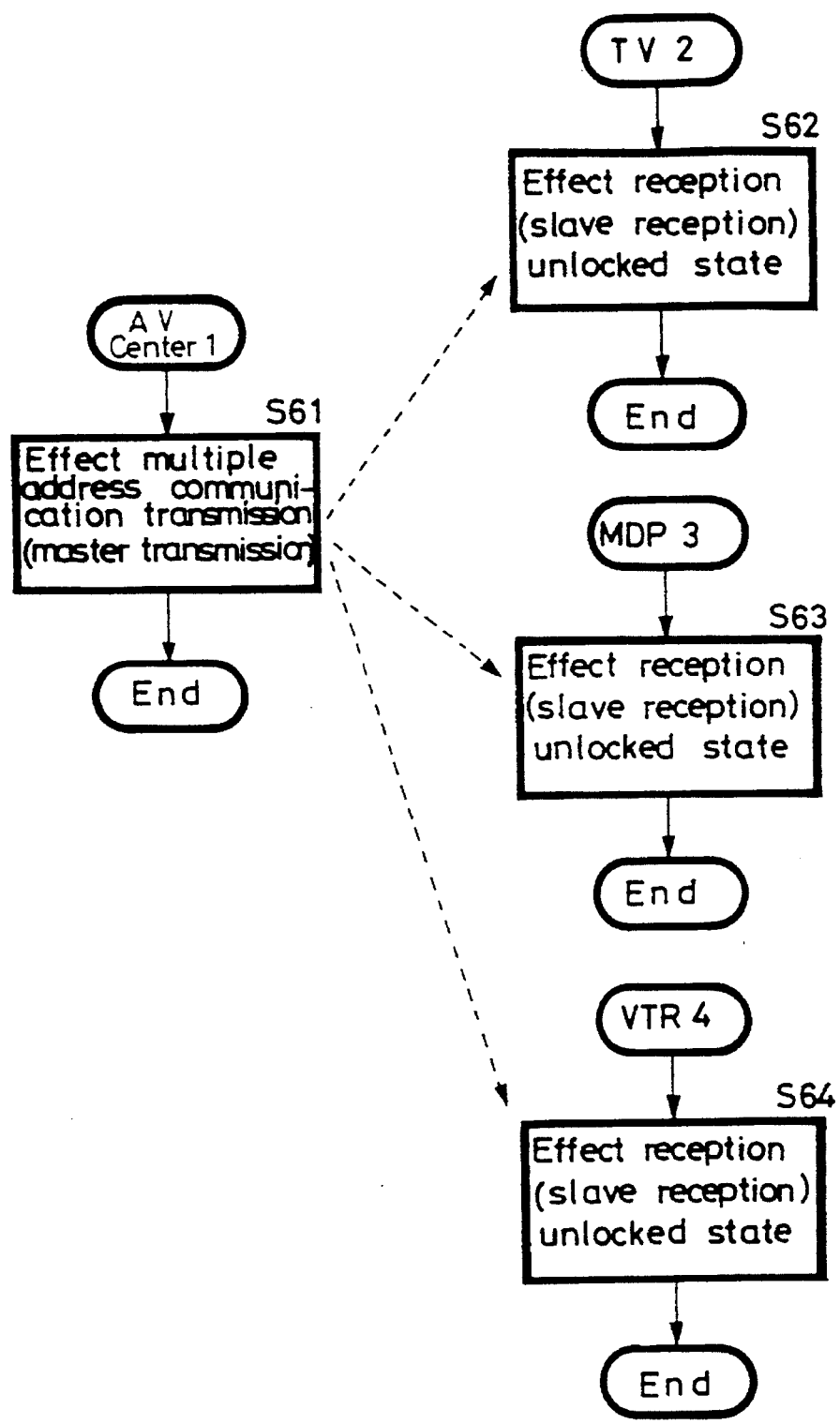
FIG. 10 is a flowchart to which reference will be made in explaining a communication procedure of a simulcast packet.

When the simulcast packet is transmitted from the AV center 1, as shown in a flowchart of FIG. 10, in step S61, the communication mode of the AV center 1 is set to the master transmission mode, and the simulcast packet is transmitted to all AV equipments except the AV center 1, i.e., the TV 2, the MDP 3 and the VTR 4.

Then, in steps S62 to S64, the communication modes of the TV 2, the MDP 3 and the VTR 4 are step to the slave reception modes and the simulcast packets transmitted from the AV center 1 are respectively received by the TV 2, the MDP 3 and the VTR 4. Thus, the transmission and reception of the simulcast packets, i.e., communication among the AV center 1, the TV 2, the MDP 3 and the VTR 4 is completed.

At that time, the simulcast packet transmitted from the AV center 1 is only one frame and the TV 2, the MDP 3 and the VTR 4 are not set in the locked state. Specifically, although the TV 2, the MDP 3 and the VTR 4 receive the simulcast packets, they are left in the unlocked state.

In this case, while the simulcast packets transmitted from the AV center 1 are all received by the TV 2, the MDP 3 and the VTR 4 except the AV center 1, the simulcast packets may be received by only two of the TV 2, the MDP 4 and the VTR 4, for example.

Figure 11:
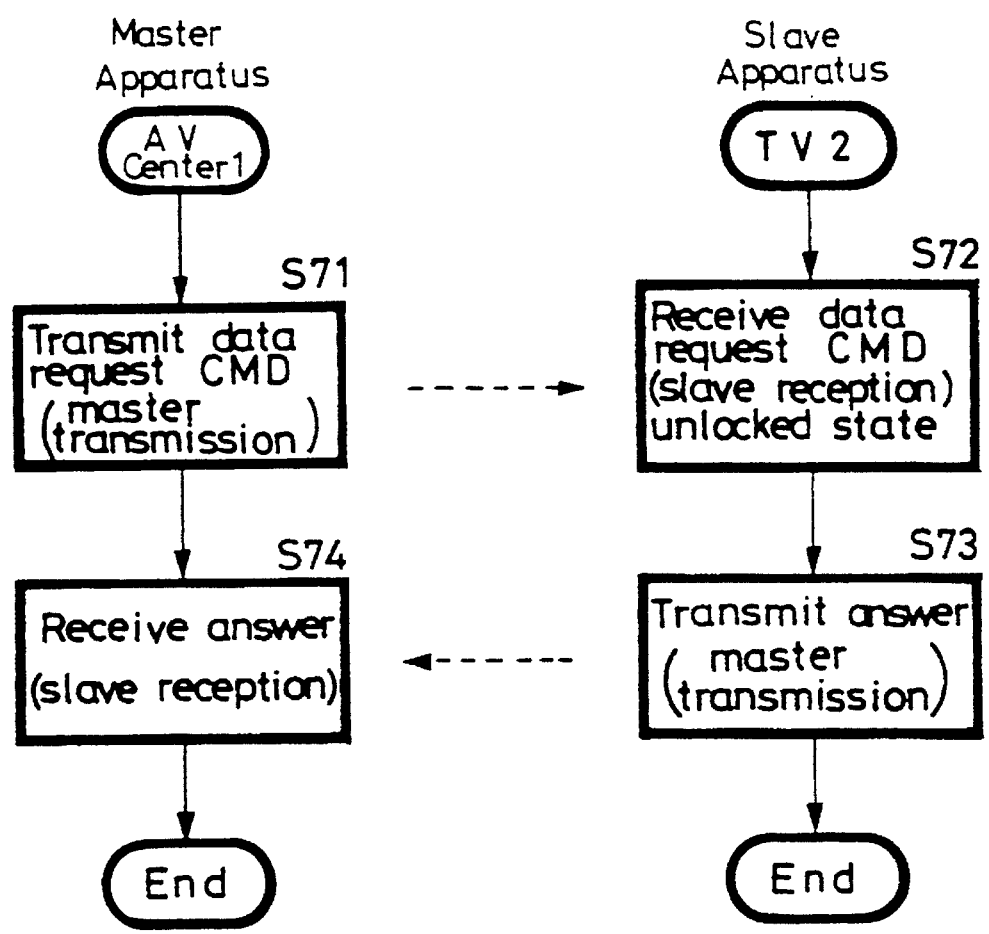
FIG. 11 is a flowchart to which reference will be made in explaining a communication procedure of a DATAREQ packet.

When the DATAREQ packet is transmitted from the AV center 1, for example, to the TV 2 to start the communication, as shown in a flowchart of FIG. 11, in step S71, the AV center 1 is set as the master apparatus and its communication mode is set to the master transmission mode, whereby the DATAREQ packet is transmitted to the TV 2.

In step S72, the TV 2 is set as the slave apparatus and its communication mode is set to the slave reception mode, whereby the DATAREQ packet transmitted from the AV center 1 is received by the TV 2. Thus, the transmission and reception of the DATAREQ packet, i.e., communication between the AV center 1 and the TV 2 is completed.

At that time, the DATAREQ packet transmitted from the AV center 1 is only one frame and the TV 2 is not set in the locked state. In other words, even though the TV 2 receives the DATAREQ packet, it is left in the unlocked state.

In step S73, the TV 2 described data in the ANS (answer) packet on the basis of the described content of the DATAREQ packet received at step S72 and returns (transits) the ANS packet to the AV center 1 which transmitted the DATAREQ packet.

At that time, although the TV 2 is the slave apparatus, its communication mode is set to the master transmission mode.

On the other hand, in step S74, although the AV center 1 is the master apparatus, its communication mode is set to the slave reception mode to receive the ANS packet transmitted from the TV 2, thereby the transmission and reception of the ANS packet being completed.

Figure 12:
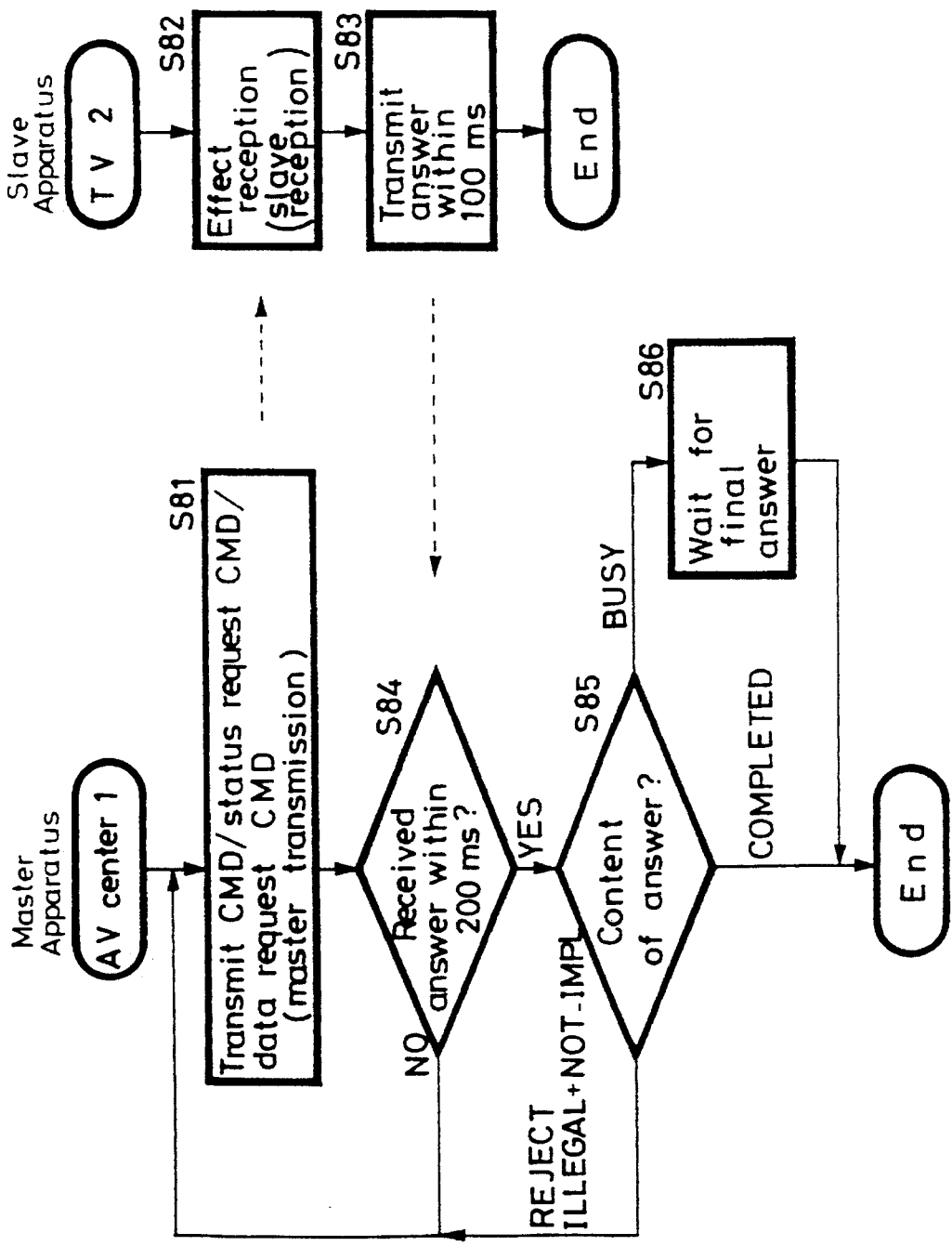
FIG. 12 is a flowchart to which reference will be made in explaining a recovery processing executed when a transmission error occurs during a packet requesting an ANS packet is transmitted/received.

A recovery processing executed when a transmission error occurs during the transmission/reception of packets for requiring the ANS packet, such as the CMD packet, the REQ packet, the DATAREQ packet between the AV center 1 and the TV 2 will be described with reference to a flowchart of FIG. 12. As shown in FIG. 12, at step S81, the AV center 1 is set as the master apparatus, and its communication mode is set to the master transmission mode to transmit the CMD/REQ/DATAREQ (CMD, REQ or DATAREQ) packets to the TV 2.

In step S82, the TV 2 is set as the slave apparatus and its communication mode is set to the slave reception mode to receive the CMD/REQ/DATAREQ packets transmitted from the AV center 1. Thus, the transmission and reception of the CMD/REQ/DATAREQ packets, i.e., communication between the AV center 1 and the TV 2 is completed.

Then, in step S83, although the TV 2 is the slave apparatus, its communication mode is in the master transmission mode to transmit the ANS packet provided as the answer to the received packet to the AV center 1 during 100 ms, for example.

In step S84, although the AV center 1 is the master apparatus, its communication mode is set in the slave reception mode to await the transmission of the ANS packet during a period longer than the maximum time 100 ms which is required by the TV 2 serving as the slave apparatus to transmit the ANS packet after having received the CMD/REQ/DATAREQ packets, e.g., 200 ms.

If the ANS packet cannot be received after 200 ms has elapsed, then the processing returns to step S81 and the step S81 and the following steps are repeated. Specifically, if the AV center 1 cannot receive the ANS packet after 200 ms has elapsed since the CMD/REQ/DATAREQ packets were transmitted, then the CMD/REQ/DATAREQ packets are transmitted one more time.

Accordingly, in this case, the CMD/REQ/DATAREQ packets can be transmitted reliably.

If the ANS packet is received as represented by a YES at decision step S84, then the processing proceeds to the next decision step S85. It is determined in decision step S85 whether or not the content of the ANS packet is equal to one of five REJECT, NOT-IMPLEMENT, ILLEGAL+NOT-IMPL, BUSY, COMPLETED. If it is determined in decision step S85 that the content of the ANS packet is equal to any one of REJECT and ILLEGAL+NOT-IMPL, then the processing returns to step S81, wherein the CMD/REQ/DATAREQ packets are transmitted one more time.

If it is determined in decision step S85 that the content of the ANS packet is equal to the BUSY, then the processing proceeds to step S86, whereat the final answer to the transmitted CMD/REQ/DATAREQ packets is awaited and the processing is ended. If it is determined in decision step S85 that the content of the ANS packet is equal to the COMPLETED, then the processing is ended.

The TV 2 serving as the AV equipment for receiving the CMD/REQ/DATAREQ packets can determine by checking the grammar of the received CMD/REQ/DATAREQ packets, i.e., determining whether or not recognizable OPC/OPR are described at the position in which the OPC/OPR (FIG. 2B) should be described (OPC/OPR are described correctly) whether or not the packet transmitted from the AV center 1 is correctly received.

If it is determined on the basis of the checked result of the grammar that the packet transmitted from the AV center 1 is not received correctly, then such packet is thrown away (not recognized as the received packet).

The case that the simulcast packets are transmitted from other AV equipments while the DATA packet formed of more than one frame is being transmitted from the AV center 1 to the TV 2, for example, will be described below.

Figure 13:
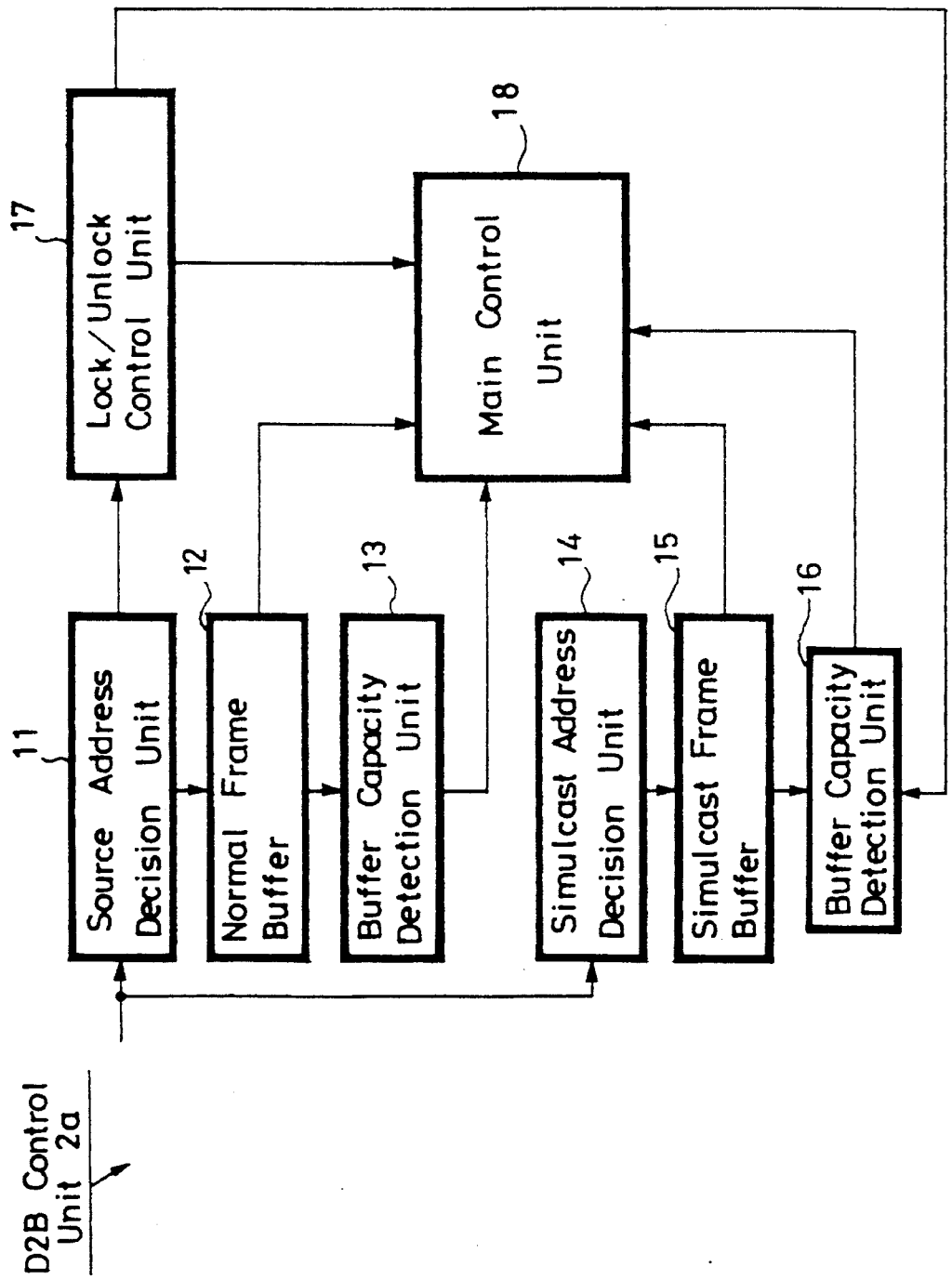
FIG. 13 is a block diagram showing an arrangement of a first embodiment of a D2B control unit of the embodiment shown in FIG. 1.

The D2B control unit 2a of the TV 2 is comprised of a source address decision unit 11, a normal frame buffer 12, a buffer capacity detection unit 13, a simulcast address decision unit 14, a simulcast frame buffer 15, a buffer capacity detection unit 16, a lock/unlock control unit 17 and a main control unit 18 as shown in FIG. 13.

When the DATA packet formed of more than one frame is transmitted from the AV center 1 to the TV 2, the source address decision unit 11 determines on the basis of destination address (FIG. 2A) of the DATA packet whether or not the address described in the destination address is the address previously assigned to the source or not. If the address described in the destination address is the address previously assigned as the source address, the source address decision unit 11 reads out the DATA packet and supplies the same to the normal frame buffer 12 and the lock/unlock control unit 17.

The lock/unlock control unit 17 sets the TV 2 in the locked or unlocked state on the basis of the control bit of the DATA packet.

In this case, since it is assumed that the DATA packet formed of more than one frame is transmitted from the AV center 1 to the TV 2, the TV 2 is set in the locked state as earlier noted with reference to FIG. 8.

The normal frame buffer 12 temporarily stores the DATA packet supplied thereto from the address address decision unit 11. On the other hand, it is determined by the buffer capacity detection unit 13 on the basis of the normal frame buffer 12 whether or not the packet is stored in the normal frame buffer 12. If the packet is stored in the normal frame buffer 12, then the buffer capacity detection unit 13 outputs a control signal to the main control unit 18 so that the main control unit 18 receives the packet stored in the normal frame buffer 12. Thus, the main control unit 18 receives the DATA packet stored in the normal frame buffer 12 and executes a predetermined processing which follows. Thereafter, if the last packet of the DATA packet formed of a plurality of frames (packets) is received, then the TV 2 is switched from the locked state to the unlocked state by the lock/unlock control unit 17.

At that time, when the packet is transmitted from other AV equipment, it is determined by the simulcast address decision unit 14 on the basis of the destination address of that packet (FIG. 2A or FIG. 2B) whether or not the described address is the address which is previously assigned to the simulcast address.

A previously set (assigned) address for simulcast packet is described in the simulcast packet in order for AV equipments other than the AV equipment which transmit the simulcast packet to receive the simulcast packet.

If it is determined by the simulcast address decision unit 14 that the simulcast address is described in the destination address of the packet transmitted from other AV equipment, i.e., a packet is the simulcast packet, the simulcast packet is supplied to and temporarily stored in the simulcast frame packet 15.

It is determined by the buffer capacity detection unit 16 on the basis of the lock/unlock control unit 17 whether or not the TV 2 is set in the locked state or the unlocked state. If the TV 2 is set in the locked state, then after the TV 2 is set in the unlocked state, the buffer capacity detection unit 16 outputs the control signal to the main control unit 18 so that the simulcast packet stored in the simulcast frame buffer 15 is supplied to the main control unit 18.

Accordingly, in this case, even when the AV equipment is set in the locked state, the reception of the simulcast packet becomes possible.

If the TV 2 is set in the locked state when the simulcast frame buffer 15 starts storing the simulcast packet, the buffer capacity detection unit 16 outputs the control signal to the main control unit 18 immediately.

As described above, when a plurality of DATA packets are transmitted from the AV center 1 to the TV 2, the TV 2 is set in the locked state by the AV center 1. The processing for releasing the TV 2 from the locked state, i.e., setting the TV 2 from the locked state to the unlocked state, is executed by the AV center 1 with its own responsibility.

However, assuming that the locked state is not released by the AV center 1 due to some cause, then when the TV 2 is not set in the unlocked state after a predetermined time, e.g., 800 ms is elapsed since the TV 2 was set in the locked state, the TV 2 releases itself from the locked state.

Specifically, each AV equipment counts a time by a timer (not shown) after it is set in the locked state. If each AV equipment is not set in the unlocked state after 800 ms is elapsed, each AV equipment releases itself from the locked state.

When the AV equipment is set in the locked state, the simulcast packet is received as described above but other packets than the simulcast packet are not received.

Figure 14:
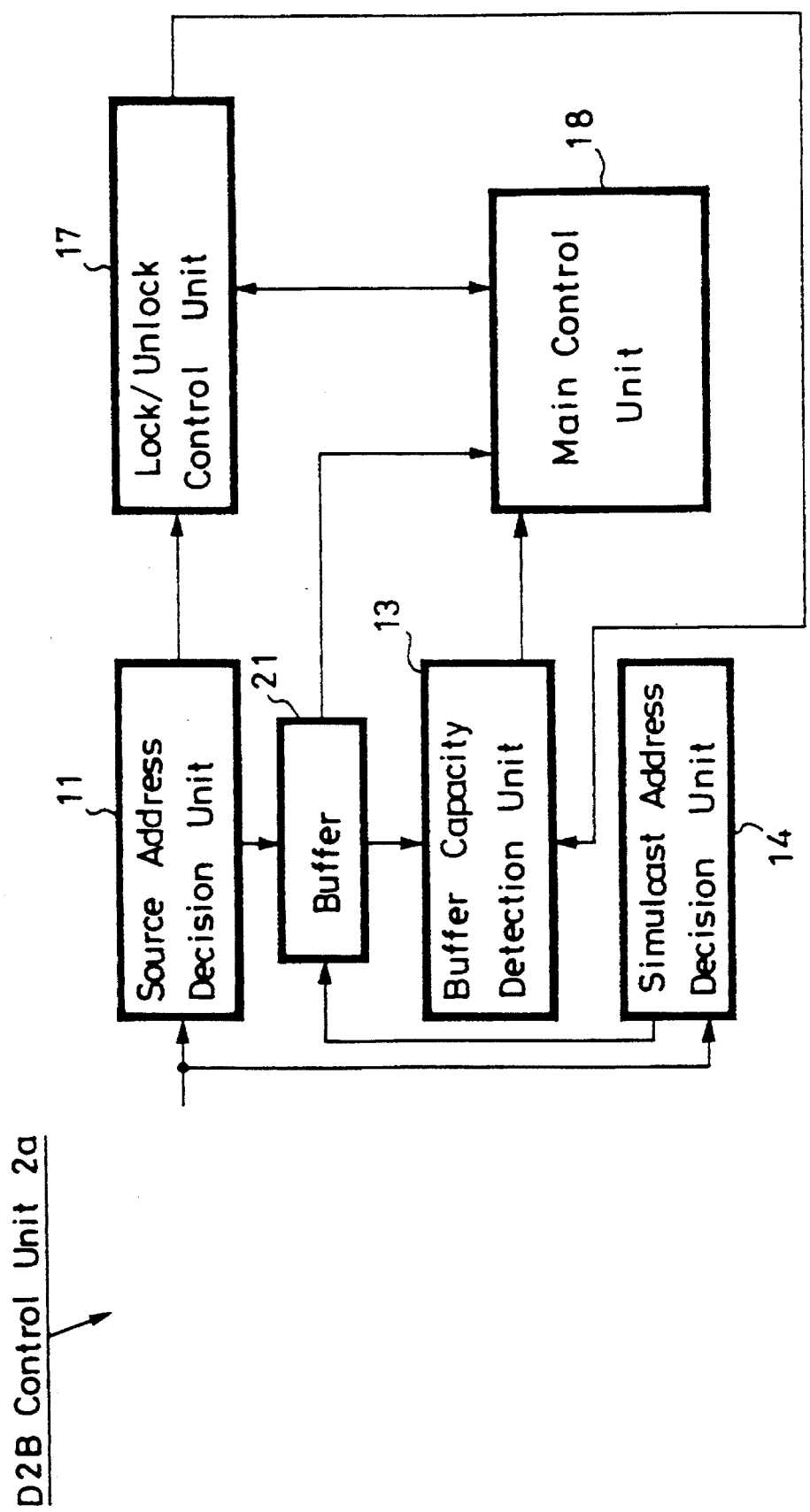
FIG. 14 is a block diagram showing an arrangement of a second embodiment of a D2B control unit of the embodiment shown in FIG. 1.

The D2B control unit 2a (FIG. 1) of the TV 2 is not limited to FIG. 13 and may be arranged as shown in FIG. 14. In FIG. 14, like parts corresponding to those of FIG. 13 are marked with the same reference.

Specifically, as shown in FIG. 13, packets other than the simulcast packet are stored in the normal frame buffer 12 and the simulcast packet is stored in the simulcast frame buffer 15. In the case shown in FIG. 14, all packets are stored in a buffer 21.

Further, in the buffer 21, an address (area) in which packets other than the simulcast packet supplied from the source address decision unit 11 are stored and an address (area) in which the simulcast packet supplied from the simulcast address decision unit 14 is stored are different from each other. Accordingly, in this case, although the addresses of the buffer 21 must be controlled, the apparatus can be simplified in arrangement as compared with the case of FIG. 13.

The transmission/reception of the simulcast packet are carried out by using the identification address of the highest priority, whereby the simulcast packet is survived in arbitration of other packets. Therefore, the simulcast packet is transmitted and received with highest priority.

Specifically, when the AV system is arranged on the basis of a so-called IEC1030, for example, the transmission/reception of the simulcast packet is carried out by using the lowest address as a common equipment address.

Figure 15:
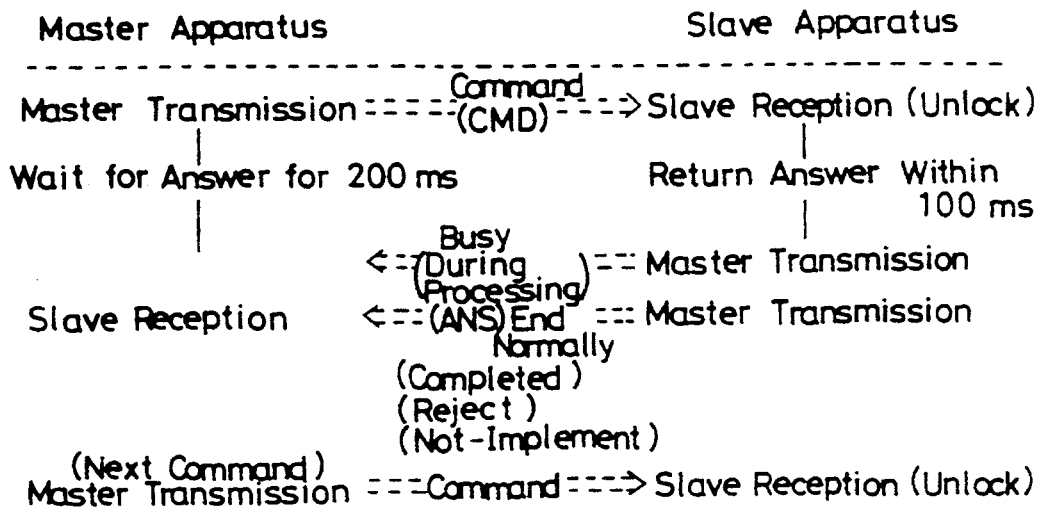
FIG. 15 is a diagram used to explain a communication procedure of a CMD packet.

The transmission and reception of respective packets will be described more in detail. Initially, in the case of the CMD packet, as shown in FIG. 15, the AV equipment which becomes the master apparatus is set in the master transmission mode to transmit the CMS packet to the AV equipment which becomes the slave apparatus. The slave apparatus is set in the slave reception mode to receive the CMD packet transmitted from the master apparatus and transmits the ANS packet in which the answer (e.g., BUSY) to the CMD packet is supplied to the master apparatus within 100 ms, for example. At that time, the slave apparatus is set in the master transmission mode.

Further, the slave apparatus transmits the ANS packet representing the final answer (completed (COMPLETED) for the CMD packet transmitted from the master apparatus, rejection of the processing (REJECT) and unable to implement the processing described in the CMD packet (NOT-IMPLEMENT) to the master apparatus in the master transmission mode.

On the other hand, the master apparatus waits for the ANS packet from the slave apparatus of the CMD packet for 200 ms. When the ANS packet is transmitted, the master apparatus receives the same in the slave reception mode. Then, after receiving the ANS packet in which the final answer is described, the master apparatus implements the next processing (transmission of the next packet).

Figure 16:
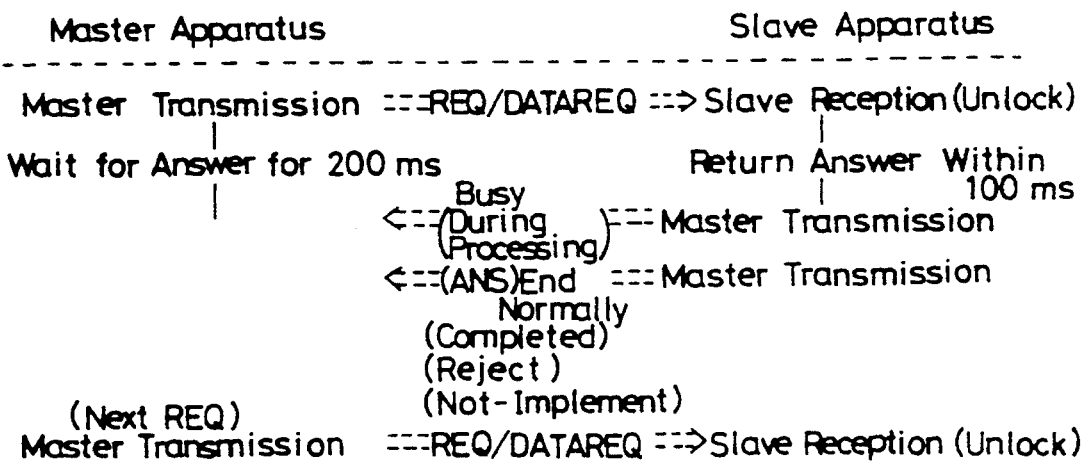
FIG. 16 is a diagram used to explain a communication procedure of a REQ/DATAREQ packet.

When the packet transmitted from the master apparatus is the REQ/DATAREQ (REQ or DATAREQ) packet, a communication among the AV equipments is carried out as shown in FIG. 16. Specifically, when the packet transmitted from the master apparatus is the REQ/DATAREQ packet, the packet is transmitted similarly to the case of the CMD packet (FIG. 15).

Further, when the packet transmitted from the master apparatus is the DATA packet, if this DATA packet is formed of one frame (packet), then a communication is carried out as shown in FIG. 17. Specifically, as earlier noted with reference to FIG. 7, the master apparatus transmits the DATA packet to the slave apparatus in the master transmission mode and the slave apparatus receives the DATA packet transmitted from the master apparatus in the slave reception mode.

When the DATA packet is formed of a plurality of frames (packets), a communication is carried out as shown in FIG. 18. Specifically, when the DATA packet is formed of 3 frames (packets), for example, the master apparatus transmits the first DATA packet to the slave apparatus in the master transmission mode. Then, the master apparatus is set in the standby mode for at least 8 ms, for example, and then transmits the second DATA packet to the slave apparatus. Then, the master apparatus is set in the standby mode for at least 8 ms and transmits the last packet to the slave apparatus.

On the other hand, the slave apparatus sequentially receives the three packets transmitted from the master apparatus in the slave reception mode. At that time, the slave apparatus is set in the locked state at the time when it receives the first packet and is set in the unlocked state at the time when it receives the last packet.

When the slave apparatus returns (transmits) the ANS packet to the master apparatus which transmits the ANS packet request packet, as shown in FIG. 19, the slave apparatus transmits the ANS packet to the master apparatus in the master transmission mode, and the master apparatus receives the ANS packet transmitted from the slave apparatus in the slave reception mode.

Figure 20:
FIG. 20 is a diagram used to explain a communication procedure of a status automatic transmission packet.

When the transmitted packet is the automatic status sending packet, as shown in FIG. 20, the transmission side transmits the automatic status sending packet in the master transmission mode, and the reception side receives the automatic status sending packet transmitted from the master apparatus in the slave reception mode.

Figure 21:
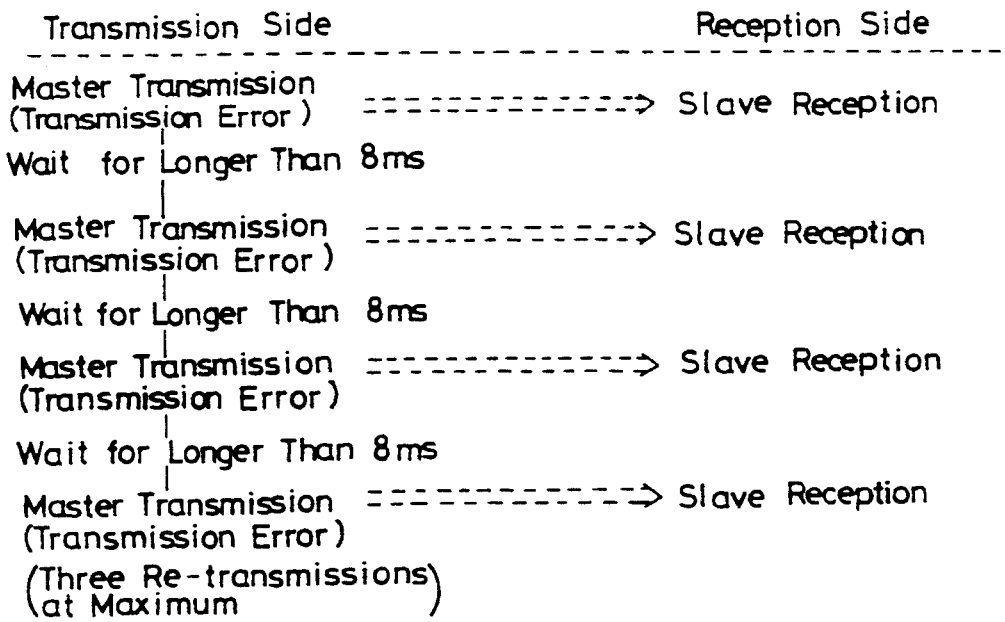

If a transmission error occurs in the destination address or control bit described in the packet when the CMD packet, the DATAREQ packet, the DATA packet, the ANS packet or the automatic status sending packet (CMD/REQ/DATAREQ/DATA/ANS/automatic status sending packet) is transmitted, then the processing shown in FIG. 21 is executed.

Each AV equipment which received the packet returns the 1-bit signal ACK (acknowledge) to the AV equipment which transmitted the packet each time receiving 1-byte data. Since the transmission side knows the length of the packet it transmitted, it is possible to detect an error such as a bit dropout or the like during the transmission of the packet by counting the number of the signal ACK transmitted from the reception side.

When CMD/REQ/DATAREQ/DATA/ANS/automatic status sending packet is transmitted, if the transmission error is detected in the destination address or control bit described in the packet by counting the number of the signal ACK transmitted from the reception side by the transmission side, then as shown in FIG. 21, the transmission side is set in the standby mode for 8 ms, for example, and transmits the CMD/REQ/DATAREQ/DATA/ANS/automatic status sending packet one more time.

When a similar transmission error occurs four times and the packet cannot be transmitted correctly even by transmitting the CMD/REQ/DATAREQ/DATA/ANS/automatic status sending packet three times one more time, the transmission of the packet is abandoned.

Figure 22:
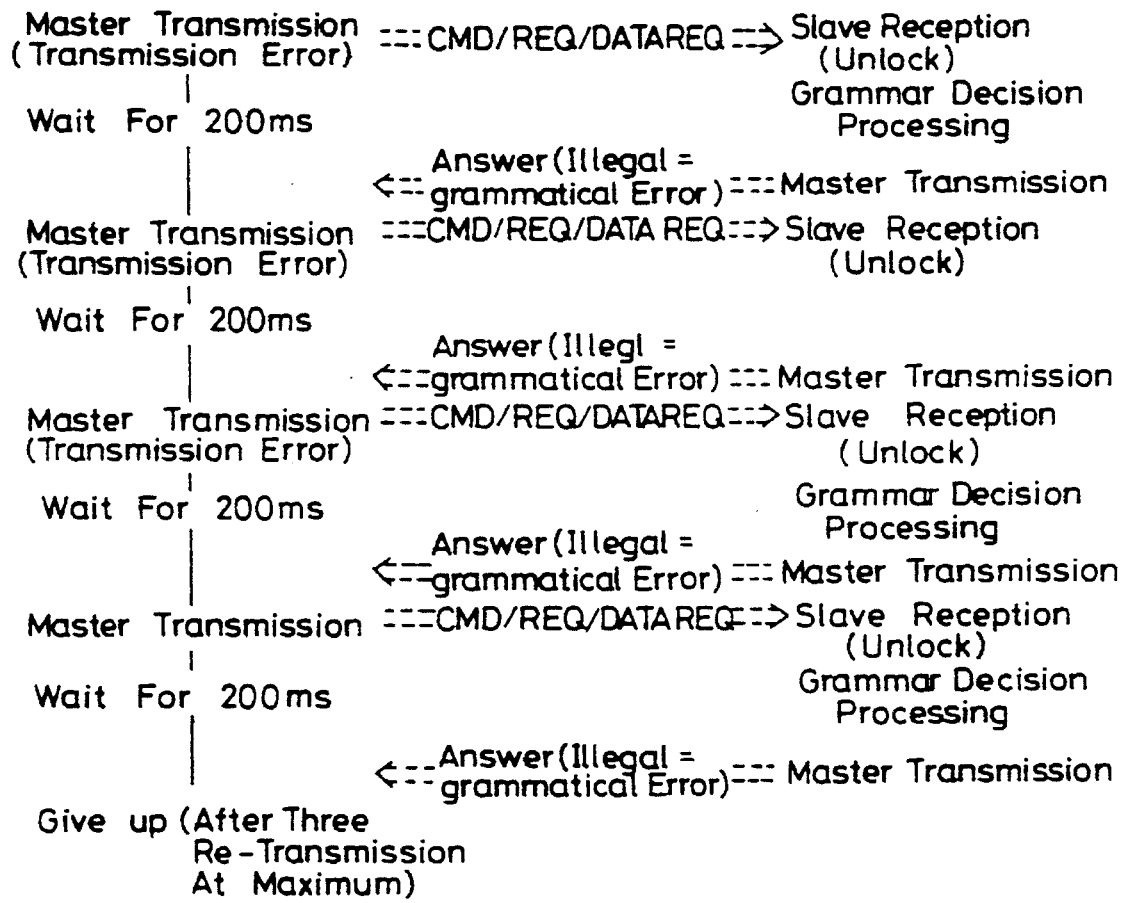

If a transmission error occurs in the portion behind the control bit described in the packet (e.g., TEXT-HD or HD-OPR shown in FIG. 2B) so that the ANS packet in which the ILLEGAL+NOT–IMPL representative of the grammatical error is returned (transmitted) from the reception side (slave apparatus) when the CMD/REQ/DATAREQ packet is transmitted, then a processing shown in FIG. 22 is executed.

Specifically, when the ANS packet representing ILLEGAL+NOT–IMPL is received before 200 ms is elapsed when the transmission error is detected on the basis of the signal ACK transmitted from the reception side (slave apparatus) after the CMD/REQ/DATAREQ packet is transmitted, the CMD/REQ/DATAREQ packet is transmitted one more time. If the transmission error is detected on the basis of the difference of the count values of the signals ACK even by transmitting the CMD/REQ/DATAREQ packet three times and the ANS packet representing ILLEGAL+NOT–IMPL= is received, the transmission of the CMD/REQ/DATAREQ packet is abandoned.

If the transmission error is detected on the basis of the signal ACK transmitted from the reception side (slave apparatus) after the CMD/REQ/DATAREQ packet is transmitted and the ANS packet transmitted from the reception side (slave apparatus) cannot be received by the transmission side (master apparatus) even after the standby mode of 200 ms, for example, then as shown in FIG. 23, the CMD/REQ/DATAREQ packet is transmitted one more time. If the transmission error is detected even when this re-transmission is carried out three times and the ANS packet cannot be received, the transmission of the CMD/REQ/DATAREQ packet is abandoned.

If the transmission error occurred in the portion behind the control bit described in the packet (e.g., TEXT-HD or HD-OPR shown in FIG. 2A) is detected by counting the number of signals ACK transmitted from the reception side by the transmission side when the DATA packet is transmitted, then as shown in FIG. 24, after the standby mode of 8 ms, for example, the DATA packet is transmitted one more time.

If a similar transmission error occurs four times and the packet cannot be transmitted correctly even when the DATA packet is re-transmitted three times, then the transmission of that packet is abandoned.

Figure 25:
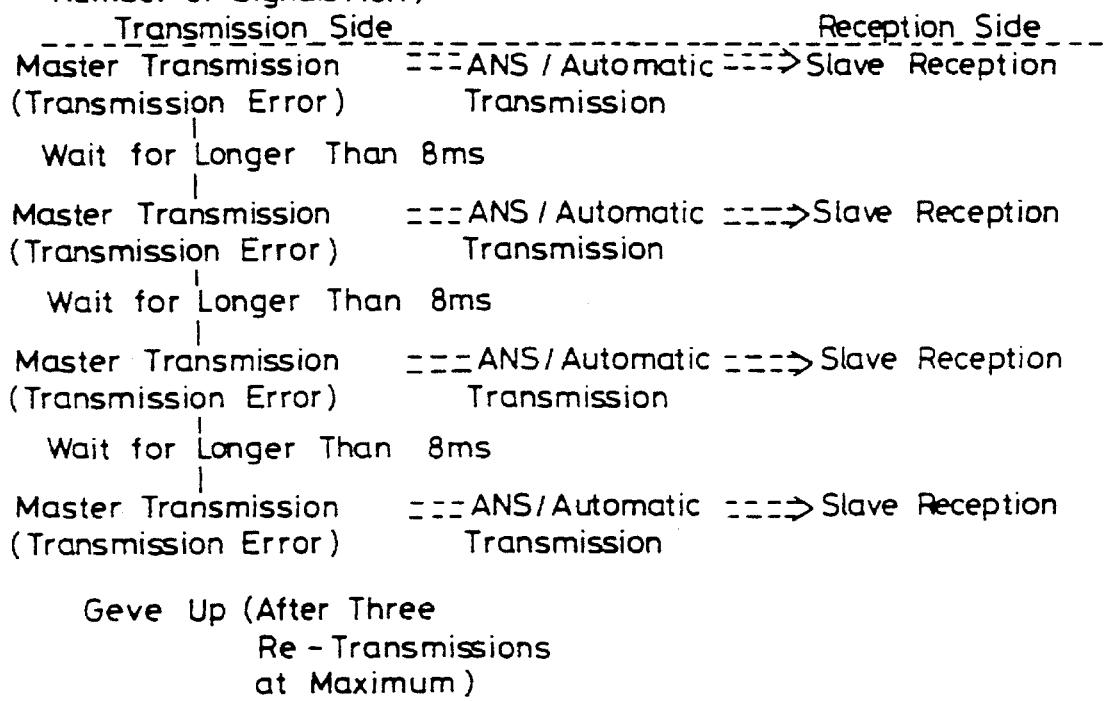

If the transmission error occurred in the portion behind the control bit described in the packet (e.g., TEXT-HD or HD-OPR shown in FIG. 2B) is detected by counting the number of the signals ACK transmitted from the reception side by the transmission side when the ANS/automatic status sending packet is transmitted, then as shown in FIG. 25, the ANS/automatic status sending packet is transmitted one more time after the standby mode of 8 ms, for example.

If the packet cannot be transmitted correctly even by re-transmitting the ANS/automatic status sending packet three times similarly to the case (FIG. 24) of the DATA packet, then the transmission of that packet is abandoned.

Figure 26:
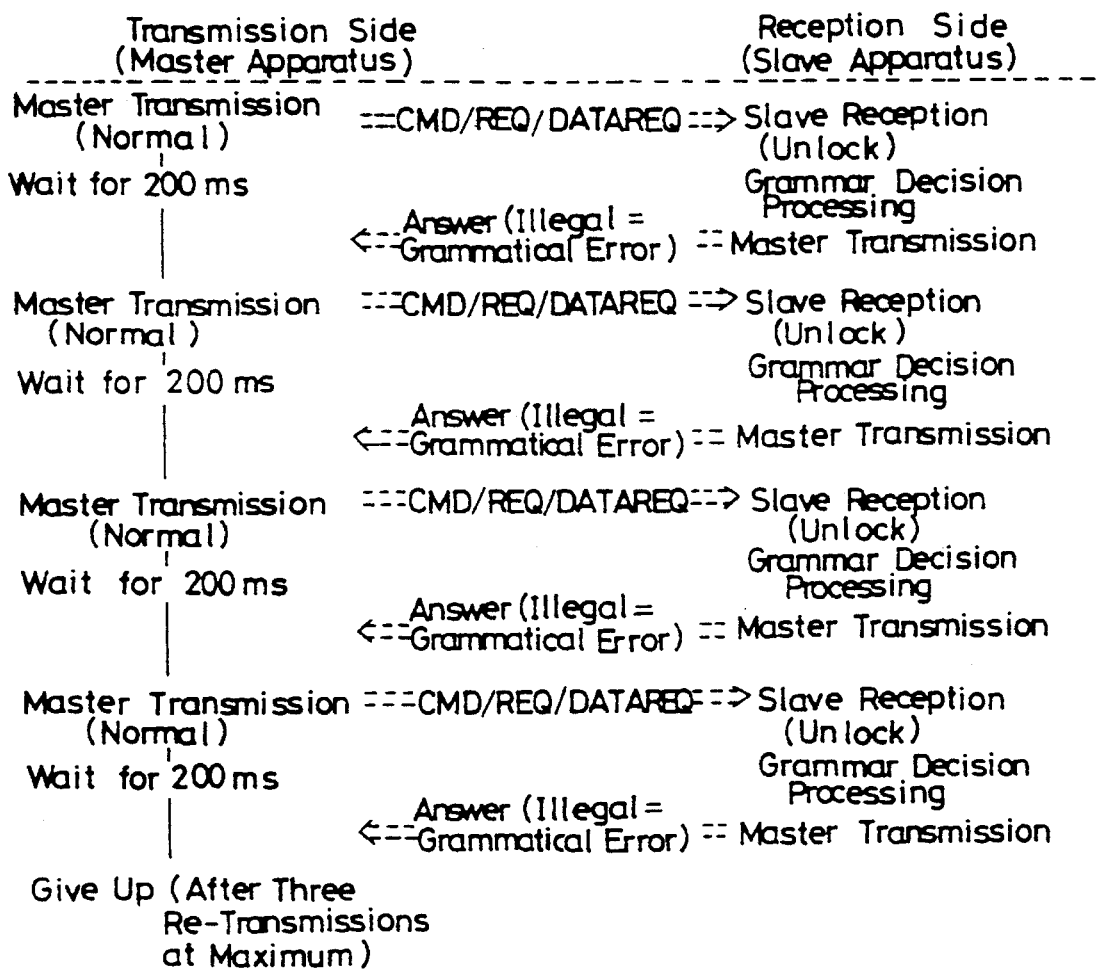
FIG. 26 is a diagram used to explain a recovery procedure executed when the content of an ANS packet answered is a grammatical error.

If the ANS packet representing ILLEGAL+NOT–IMPL is returned (transmitted) from the reception side (slave apparatus) even when the CMD/REQ/DATAREQ packet can be transmitted correctly, i.e., even when the count value of the ACK number is normal, then a processing shown in FIG. 26 is implemented.

More specifically, if the ANS packet representing ILLEGAL+NOT–IMPL is received within 200 ms after the CMD/REQ/DATAREQ packet is transmitted by the transmission side (master apparatus), then the CMD/REQ/DATAREQ packet is transmitted one more time. If the ANS packet representing ILLEGAL+NOT–IMPL is received even by re-transmitting the CMD/REQ/DATAREQ packet three times, the transmission of the CMD/REQ/DATAREQ packet is abandoned.

Figure 27:
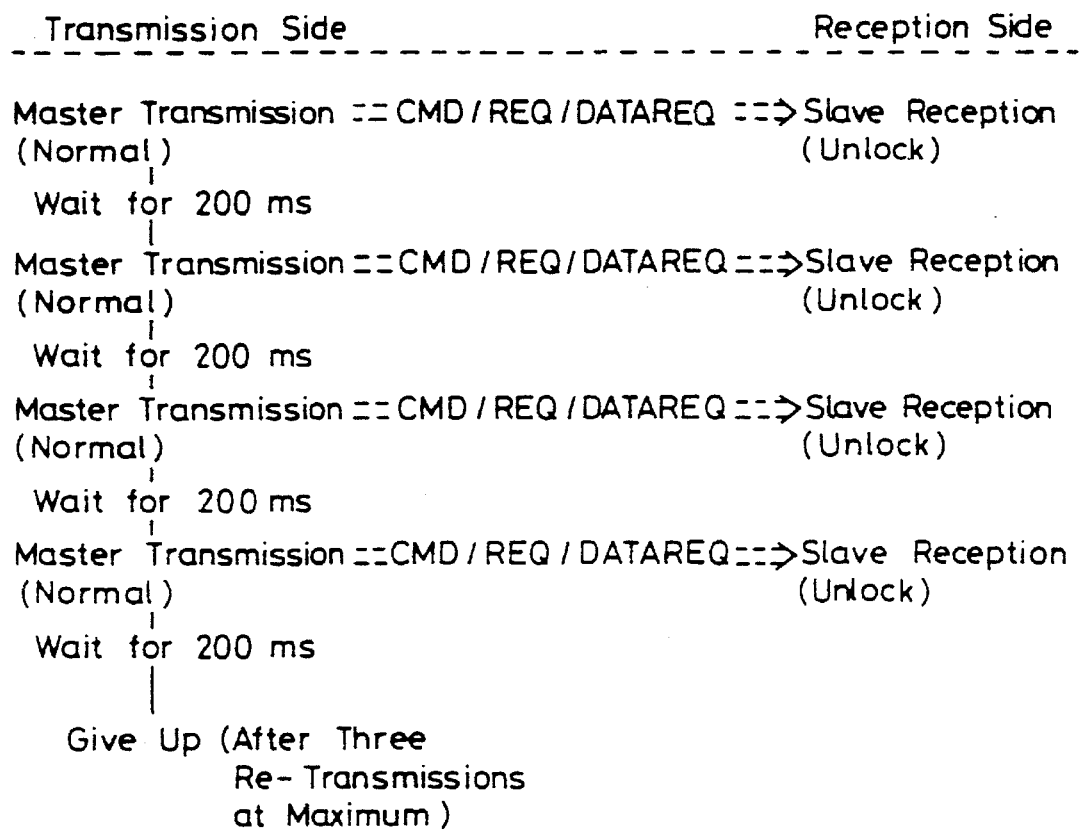
FIG. 27 is a diagram used to explain a recovery procedure executed when the ANS packet could not be received.

If the ANS packet transmitted from the reception side (slave apparatus) cannot be received by the transmission side (master apparatus) even after 200 ms, for example, since the CMD/REQ/DATAREQ packet was transmitted, then the CMD/REQ/DATA REQ packet is sent again as shown in FIG. 27. Then, if the ANS packet cannot be received even when the CMD/REQ/DATAREQ packet is sent three times, then the transmission of the CMD/REQ/DATAREQ packet is abandoned.

In this case, it is possible to understand the status of the reception side (slave apparatus) by transmitting the REQ packet.

Figure 28:
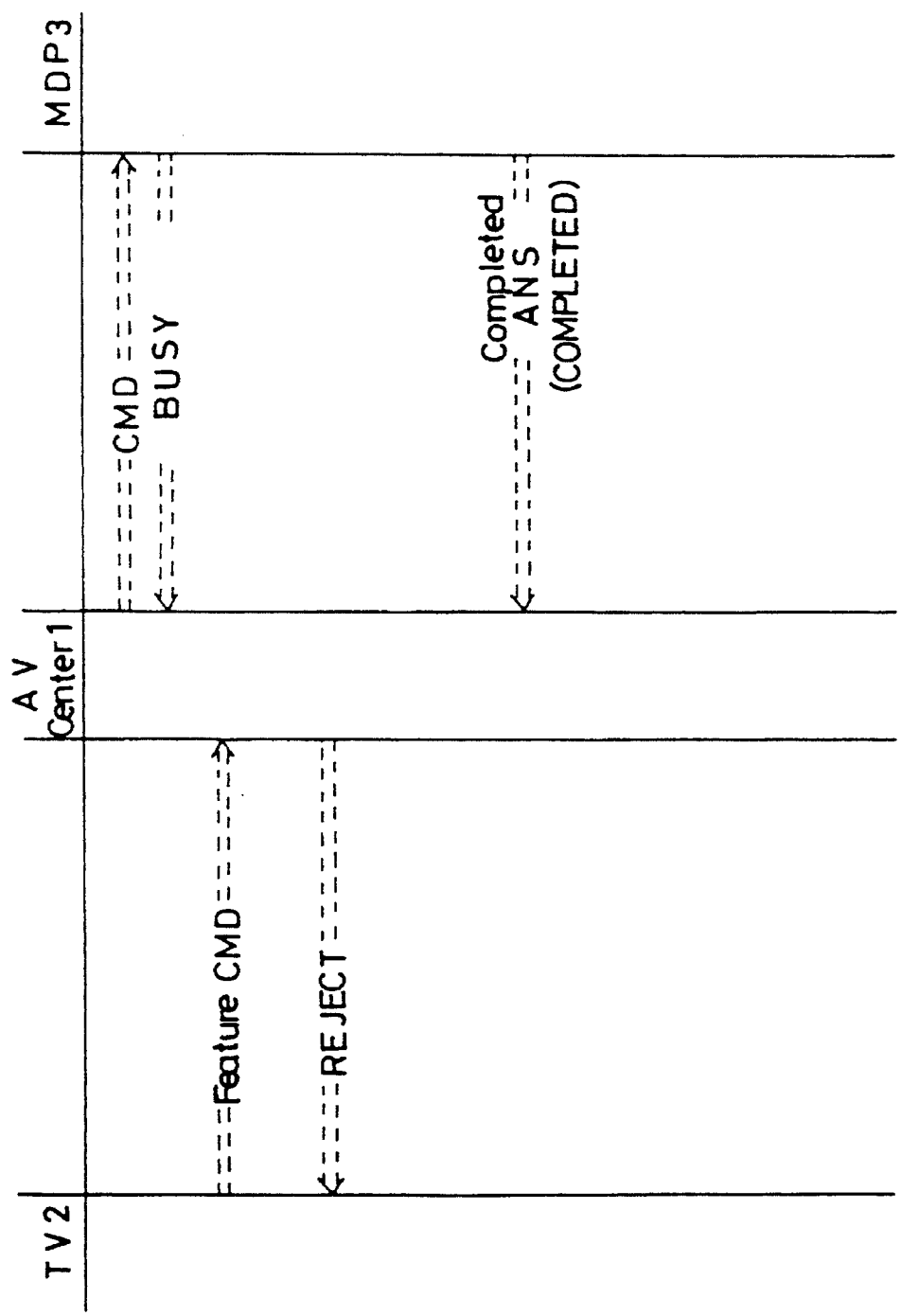
FIGS. 28 through 32 are respectively diagrams used to explain operation of the embodiment shown in FIG. 1.

Operation of the embodiment shown in FIG. 1 will be described with reference to FIGS. 28 to 32. FIG. 28 describes the state that the packets are communicated when the CMD packet concerning the features, for example, is transmitted from the TV 2 to the AV center 1 while the CMS packet transmitted from the AV center 1 to the MDP 3 is to be processed. When the CMD packet is transmitted from the AV center 1 and received by the MDP 3, the MDP 3 transmits the ANS packet in which BUSY is described (representing that the processing for this CMD packet is now being executed) to the AV center 1.

The AV center 1 is set in the standby mode for waiting for the ANS packet representing that the processing for the CMD packet is completed transmitted from the MDP 3, i.e., the ANS packet in which COMPLETED is described. If the CMD packet concerning the feature is transmitted from the TV 2 to the AV center 1 during that period of time, then the ANS packet representing that the processing for the CMD packet thus transmitted cannot be executed, i.e., the ANS packet in which REJECT is described is transmitted from the AV center 1 to the TV 2.

Then, when receiving the ANS packet representing COMPLETED transmitted from the MDP 3, the AV center 1 receives a packet transmitted from other AV equipment and effects the processing on the packet thus received.

Figure 29:
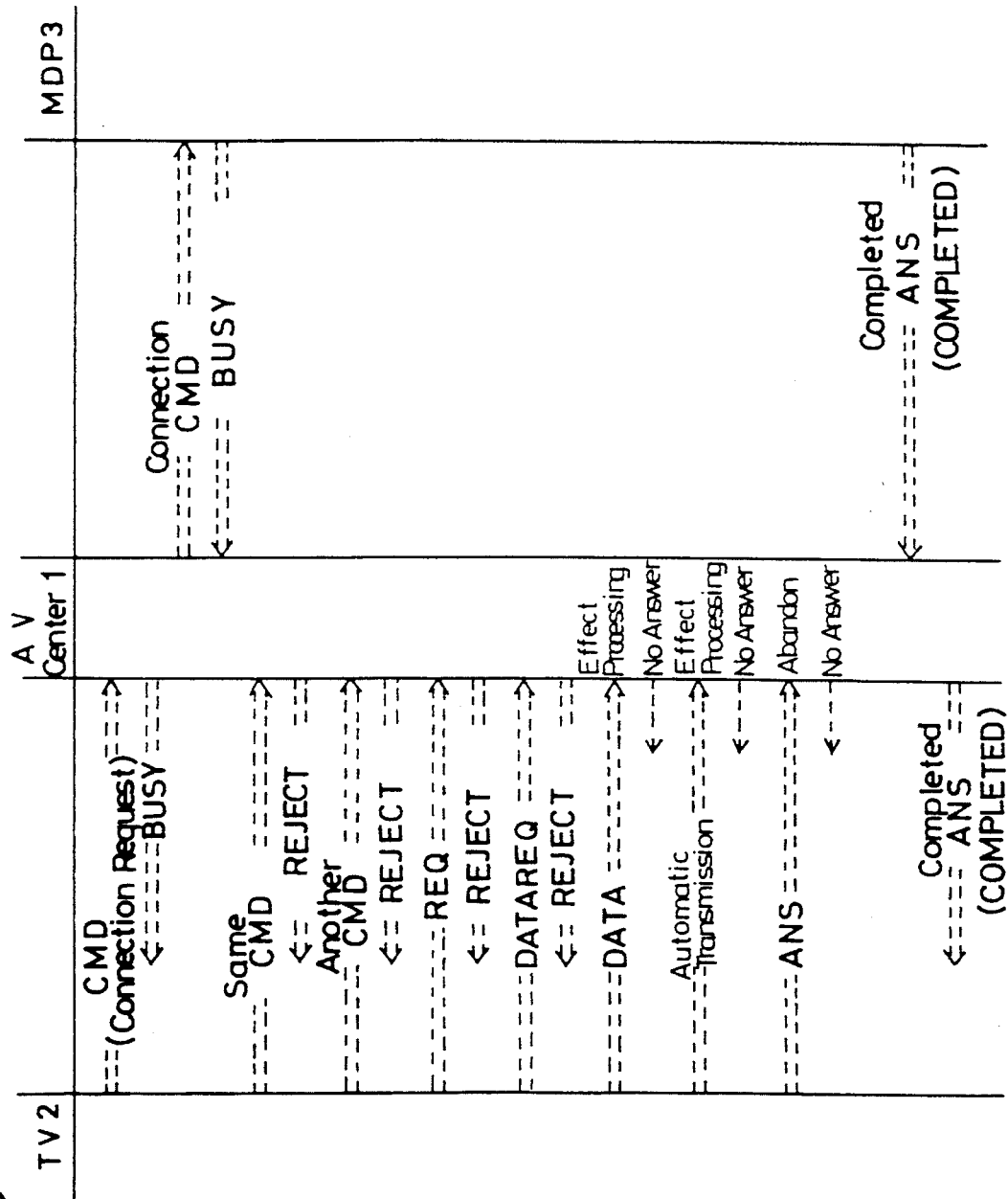

If the AV center 1 receives from the TV 2 a CMD packet concerning a connection request with the MDP 3 (referred to hereinafter as "connection request packet" for simplicity), as shown in FIG. 29 (or FIG. 30), the AV center 1 transmits the ANS packet representing BUSY to the TV 2 and further transmits a CMD packet concerning the connection (referred to hereinafter as "connection CMD packet" for simplicity) based on the CMD packet received from the TV 2 to the MDP 3.

When receiving the connection CMD packet transmitted from the AV center 1, the MDP 3 effects the processing on the connection CMD packet thus received and transmits the ANS packet representing BUSY to the AV center 1.

Then, the AV center 1 is set in the standby mode for awaiting the answer. Specifically, the AV center 1 sends the ANS packet representing REJECT (or BUSY) even though a CMD packet similar to the connection request CMD packet initially transmitted from the TV 2 and a different CMD packet, the REQ packet and the DATAREQ packet are transmitted thereto.

In this case, when the DATA packet or the automatic status sending packet is transmitted from the TV 2, the AV center 1 receives that packet and executes the processing for such received packet. When the ANS packet is transmitted from the TV 2, the AV center 1 receives and abandons the ANS packet. Even when any one of the DATA packet, the automatic status sending packet and the ANS packet transmitted from the TV 2 is received by the AV center 1, the AV center 1 does not answer such packet (ANS packet is not transmitted).

Figure 30:
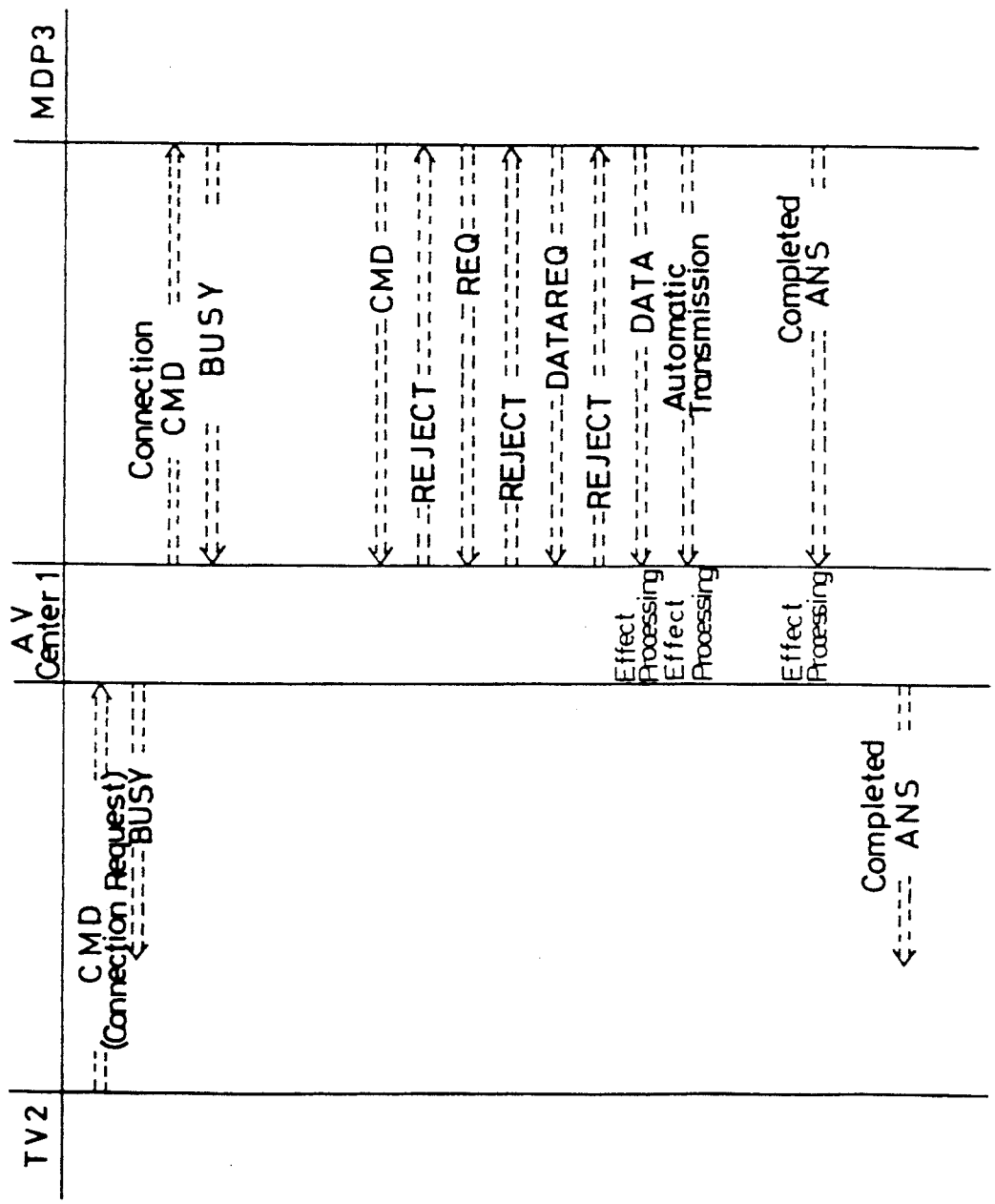

In this case, as shown in FIG. 30, even when the CMD packet, the REQ packet and the DATAREQ packet are transmitted from the MDP 3 to the AV center 1, the AV center 1 sends the ANS packet representing REJECT (or BUSY).

However, when the DATA packet or the automatic status sending packet is transmitted from the MDP 3, the AV center 2 receives such packet and effects the processing on the packet thus received. Incidentally, when any one of the DATA packet and the automatic status sending packet transmitted from the MDP 3 is received by the AV center 1, the AV center 1 does not answer such packet (ANS packet is not transmitted).

Figure 31:
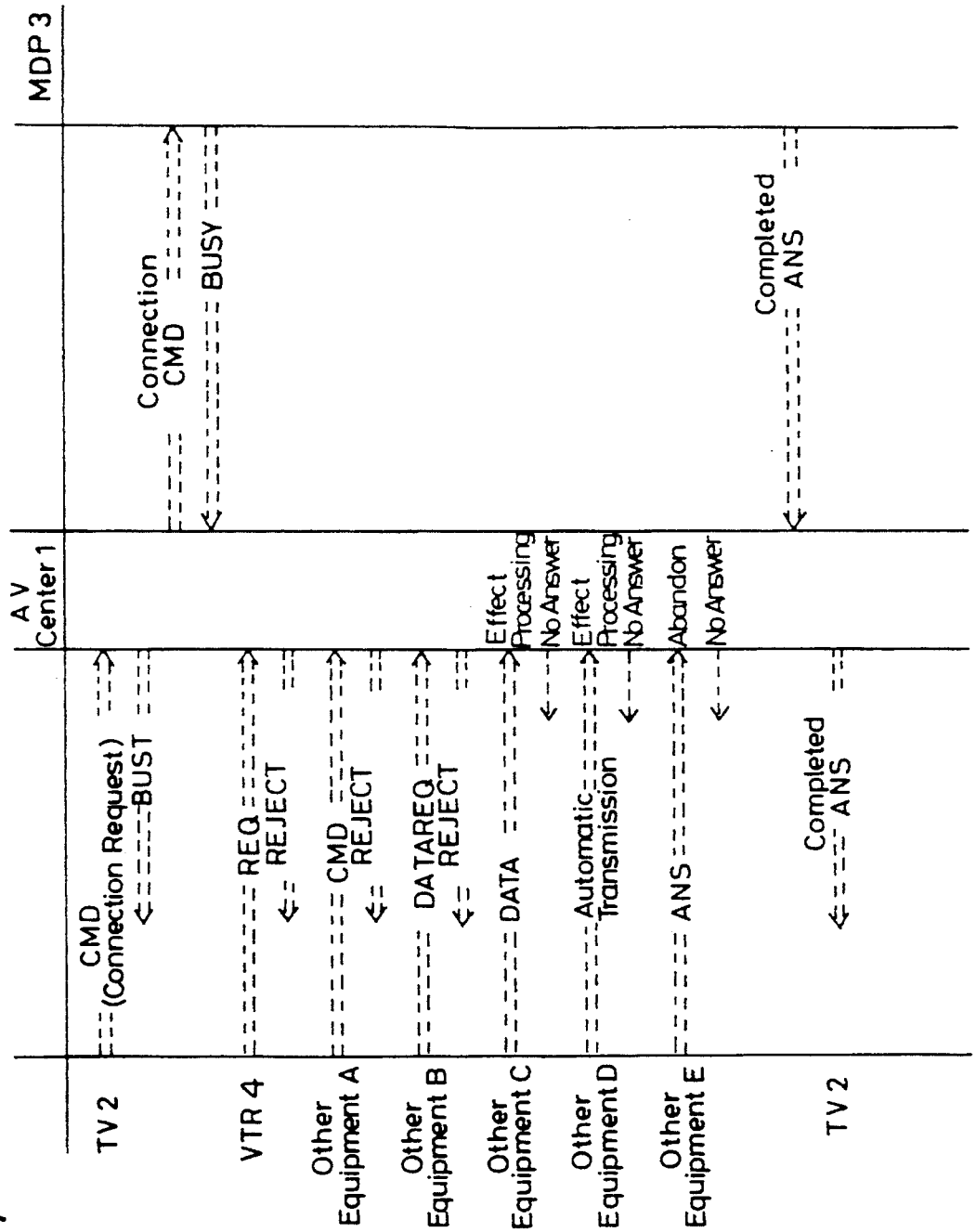

As shown in FIG. 31, the AV center 1 carries out similar processing not only when the CMD packet, the REQ packet, the DATAREQ packet, the DATA packet, the automatic status sending packet and the ANS packet are transmitted from the TV 2 or the MDP 3 but also when the CMD packet, the REQ packet, the DATAREQ packet, the DATA packet, the automatic status sending packet and the ANS packet are transmitted from other AV equipments (not shown).

Then, as shown in FIG. 29 (or FIG. 30), when receiving the ANS packet representing COMPLETED from the MDP 3, the AV center 1 transmits the ANS packet representing COMPLETED to the TV 2.

Figure 32:
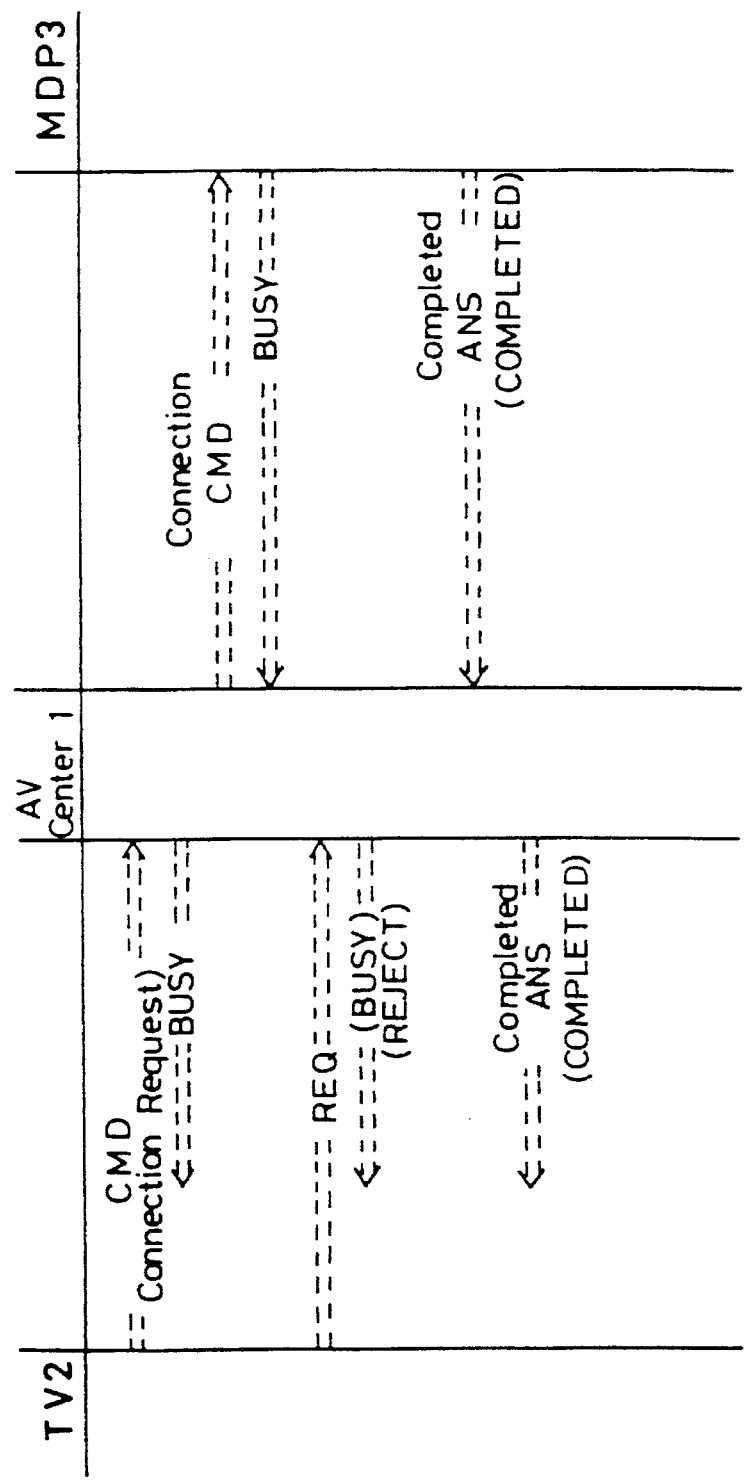

The ANS packet for one REQ packet may be transmitted only one time. Therefore, as shown in FIG. 32, when the AV center 1 receives the REQ packet from the TV 2, for example, while the AV center 1 is in the answer standby state (i.e., the AV center 1 is in the standby state for awaiting the ANS packet representing COMPLETED transmitted from the MDP 3), the TV 2 can recognize the ANS packet representing BUSY or REJECT transmitted thereto as the answer for the REQ packet.

Accordingly, the TV 2 can recognize the ANS packet representing COMPLETED transmitted from the AV center to the TV 2 after the ANS packet representing BUSY or REJECT as the answer to the first connection request packet.

The transmission of the packet is not limited to one time and the same packet may be transmitted twice, for example. If the same packet is transmitted twice, then the packet can be transmitted more accurately though a transmission time is increased.

FIGS. 33A through 33D are diagrams showing formats of respective frames of OSD data used when OSD data formed of two frames is transmitted twice each. FIG. 33A shows a format of frame 1 (right frame 1) transmitted first and FIG. 33B shows a format of a frame 1 (substitute frame 1) transmitted second. Similarly, FIG. 33C shows a format of a frame 2 (right frame 2) transmitted first and FIG. 33D shows a format of a frame 2 (substitute frame 2) transmitted second.

As shown in FIGS. 33A through 33D, information described at the position of the DT-ATR of the frame can be changed in the right frames and the substitute frames as shown by 60$h$ in FIG. 33A, 61$h$ in FIG. 33B, 62$h$ in FIG. 33C and 63$h$ in FIG. 33D. It is possible, in this case, to determine on the basis of information described at the position of the DT-ATR of the transmitted frame whether the transmitted frame is the right frame or the substitute frame. Therefore, the error recovery processing executed on the transmission and reception sides when a transmission error occurred can be simplified.

While the AV center 1 and the TV 2 are arranged separately as described above, the present invention is not limited thereto and the AV center 1 and the TV 2 may be formed as one body.

While the present invention is applied to the AV system as described above, the present invention is not limited to the AV system and may be applied to a so-called personal computer communication system and a system in which a computer is connected to the AV equipments.

According to the communication system of the present invention, the command packet, the status request command packet, the data request command packet, the pure data packet, the answer packet, the automatic status sending packet and the simulcast packet are transmitted among the apparatus. A communication among the apparatus is carried out at the unit of transmission/reception of one packet, and each of the packets excepting the pure data packet is formed of one frame. Therefore, a communication among the apparatus can be carried out efficiently by a simple procedure.

According to the communication system of the present invention, when the pure data packet is formed of at least one frame and the pure data packet is transmitted among the apparatus, if the pure data packet is formed of one frame, then a communication among the apparatus is carried out at the unit of transmission/reception of the pure data packet of one frame. If the pure data packet is formed of a plurality of frames, then the apparatus which receives the pure data packet is locked at the first frame and the remaining frame are transmitted. Therefore, the pure data packet can be efficiently transmitted by a simple procedure.

According to the communication system of the present invention, when the OSD data is formed of a plurality of frames, the apparatus which receives the OSD data is locked by the first frame and unlocked by the last frame of the OSD data. Therefore, even when the packets are transmitted to the reception side from other apparatus while the pure data packet formed of a plurality of frames is being transmitted, the transmission of the pure data packet can be prevented from being interrupted. Thus, the transmission processing can be made reliable and simple.

According to the communication system of the present invention, when the pure data packet is formed of a plurality of frames, the number of frames constructing the pure data packet is limited to a predetermined number or smaller. Therefore, the buffers of the apparatus which receives the pure data packet can be reduced and the apparatus can be simplified in arrangement and made inexpensive.

According to the communication system of the present invention, information representing the number of data in the frame is described in each of the frames constructing the pure data packets. Accordingly, the reception side can determine by comparing the number of data actually received by the reception side and the number of data provided within the received frame whether or not a transmission error occurs. Therefore, the packets can be transmitted reliably.

According to the communication system of the present invention, when the pure data packet is formed of a plurality of frames, attribute information is described only in the first frame. Therefore, only the text data can be described in the second frame and the succeeding frames and thus the packets can be transmitted efficiently.

According to the communication system of the present invention, when the packet transmitted among the apparatus is the packet which does not request the answer, the apparatus which transmits the packet detects a transmission error. Then, after the apparatus detects the transmission error, the apparatus transmits the packet one more time with a predetermined period of time so that the packets can be transmitted reliably.

According to the communication system of the present invention, when the packet transmitted among the apparatus is the packet which requests the answer, the apparatus which transmits the packet transmits the packet one more time if the apparatus cannot receive the answer even after a predetermined period of time is elapsed. Therefore, the packets can be transmitted reliably.

According to the communication system of the present invention, when the simulcast packet is transmitted while the pure data packet is being received by the normal packet memory means, the simulcast packet memory means receives the simulcast packet regardless of the locked/ unlocked state of the apparatus. Therefore, the simulcast packet is received without fail and the transmission of the simulcast packet can be controlled with ease.

According to the communication system of the present invention, when the simulcast packet is transmitted while the pure data packet is being received by the memory means having a simulcast packet memory address for temporarily storing a transmitted packet and an address for storing other packets than the simulcast packet, the simulcast packet is stored by the memory means at its address different from the address for storing the pure data packet. Therefore, the simulcast packet can be received without fail and the transmission of the simulcast packet can be controlled with ease.

According to the communication system of the present invention, since the simulcast packet is transmitted with a highest priority, the transmission of the simulcast packet can be controlled with ease.

According to the communication system of the present invention, since the packet which does not request the answer is the automatic status sending packet, the automatic status sending packet can be transmitted reliably.

Further, according to the communication system of the present invention, the same frame is transmitted substantially twice. Therefore, when a transmission error occurs, the error recovery processing can be carried out rapidly and the error recovery processing on the transmission and reception sides can be simplified.

Furthermore, according to the communication system of the present invention, information representing whether or not the frame is a data frame is described in the frame at its predetermined position. Therefore, such information can be read out with ease, and it is possible to determine by such information whether or not the received frame is the data frame. Thus, the packet can be analyzed with ease.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A method for communicating data by one apparatus with a plurality of apparatus by a serial format comprising:

transmitting a command packet to issue an operation command;

transmitting a status request packet to inquire a status of one of the plurality of apparatus;

transmitting a datum packet to communicate pure data to one of the plurality of apparatus;

transmitting a data request packet requesting data from one of the plurality of apparatus;

receiving from one of a plurality of apparatus an answer packet responding to one of the command packet, the status request packet and the data request packet;

transmitting an automatic status sending packet to voluntarily inform a status of the one apparatus; and transmitting a simulcast packet to broadcast simulcast datum to the plurality of apparatus.

2. A method for communicating data by aerial format as claimed in claim 1, wherein the command packet, the status request packet, the data request packet, the answer packet, the automatic status sending packet, and the simulcast packet comprise one frame.

3. A method for communicating data by a serial format as claimed in claim 1, wherein the answer packet from the one of the plurality of apparatus to which the corresponding one of the command packet, the status request packet and the data request packet is transmitted comprises one of a reject message for specifying that the one of the plurality of apparatus cannot perform a processing of the corresponding one of the command packet, the status request packet and the data request packet at a present time, a not-implement message for specifying that the one of the plurality of apparatus has not implemented a function indicated by the corresponding one of the command packet, the status request packet and the data request packet at a present time, an illegal+not-implement message for specifying that the corresponding one of the command packet, the status request packet and the data request packet has a grammatical error or indicates a function that is not implemented by the one of the plurality of apparatus, a busy message for specifying that the one of the plurality of apparatus is currently performing the processing of the corresponding one of the command packet, the status request packet and the data request packet, and a completed message for specifying that the processing of the corresponding one of the command packet, the status request packet and the data request packet is complete.

4. A method for communicating data by a serial format as claimed in claim 2, wherein if the datum packet comprises a plurality of frames, then upon receiving a first one of the plurality of frames, the one of the plurality of apparatus to which the datum packet is transmitted is set in a lock mode until a last one of the plurality of frames of the datum packet is received by the one of the plurality of apparatus.

5. A method for communicating data by a serial format as claimed in claim 4, wherein if the datum packet comprises a plurality of frames, then a number of frames of the plurality of frames is controlled so as not to exceed a predetermined number.

6. A method for communicating data by serial format as claimed in claim 5, wherein the predetermined number is 4.

7. A method for communicating data by a serial format as claimed in claim 1, wherein if the answer packet is not received within a predetermined time after transmission of the corresponding one of the command packet, the status request packet and the data request packet by the one apparatus, then the one apparatus re-transmits the same one of the command packet, the status request packet and the data request packet.

8. A method for communicating data by a serial format as claimed in claim 7, wherein the predetermined time is 200 milliseconds.

9. A method for communicating data by a serial format as claimed in claim 3, wherein if the answer packet is a predetermined one of the reject message, the not-implement message, the illegal+not-implement message, the busy message and the completed message, then the one apparatus re-transmits the same one of the command packet, the status request packet and the data request packet.

10. A method for communicating data by a serial format as claimed in claim 9, wherein the predetermined one is the reject message or the illegal+not-implement message.

11. A method for communicating data by a serial format as claimed in claim 1, wherein if the answer packet has an improper grammar, then the one apparatus discards the answer packet.

12. A method for communicating data by a serial format as claimed in claim 4, wherein if the one of the plurality of apparatus to which the datum packet comprising the plurality of frames is transmitted remains locked for a predetermined time, then the one of the plurality of apparatus unlocks by itself.

13. A method for communicating data by a serial format as claimed in claim 12, wherein the predetermined time is 800 milliseconds.

14. A method for communicating data by a serial format as claimed in claim 1, wherein the simulcast packet has a higher priority than the command packet, the status request packet, the datum packet, the data request packet, the answer packet, and the automatic status sending packet.

15. A method for communicating data by a serial format as claimed in claim 14, wherein an address of the simulcast packet is set at a lower address than addresses of the plurality of apparatus.

16. A method for communicating data by a serial format as claimed in claim 4, wherein there is a predetermined waiting time between the plurality of frames transmitted.

17. A method for communicating data by a serial format as claimed in claim 16, wherein the predetermined waiting time is 8 milliseconds.

18. A method for communicating data by a serial format as claimed in claim 1, wherein the one of the plurality of apparatus to which one of the command packet, the status request packet, the datum packet, the data request packet, the answer packet and the automatic status sending packet is transmitted sends an acknowledge signal to the one apparatus for each received frame of the packet.

19. A method for communicating data by a serial format as claimed in claim 18, wherein the one apparatus checks the number of acknowledge signals received from the one of the plurality of apparatus to which one of the command packet, the status request packet, the datum packet, the data request packet, the answer packet and the automatic status sending packet is transmitted, and detects an error.

20. A method for communicating data by a serial format as claimed in claim 19, wherein if the one apparatus detects an error, then the one apparatus re-transmits the same one of the command packet, the status request packet, the datum packet, the data request packet, the answer packet and the automatic status sending packet after a predetermined time since the one apparatus transmitted the one of the command packet, the status request packet, the datum packet, the data request packet, the answer packet and the automatic status sending packet.

21. A method for communicating data by a serial format as claimed in claim 20, wherein the predetermined time is 8 milliseconds.

22. A method for communicating data by a serial format as claimed in claim 20, wherein if the one apparatus re-transmits the same one of the command packet, the status request packet, the datum packet, the data request packet, the answer packet and the automatic status sending packet a predetermined number of times, then this operation is aborted.

23. A method for communicating data by a serial format as claimed in claim 22, wherein the predetermined number of times is 3.

24. A method for communicating data by a serial format as claimed in claim 7, wherein there is no answer after the one apparatus transmits the corresponding one of the command packet, the status request packet and the data request packet a predetermined number of times, then the one apparatus aborts this operation.

25. A method for communicating data by a serial format as claimed in claim 24, wherein the predetermined number of times is 3.

26. A method for communicating data by a serial format as claimed in claim 9, wherein when the one apparatus transmits the same one of the command packet, the status request packet and the data request packet a predetermined number of times and the one apparatus receives respective illegal+not-implement messages, then the one apparatus aborts the operation.

27. A method for communicating data by a serial format as claimed in claim 26, wherein the predetermined number of times is 3.

28. A method for communicating data by a serial format as claimed in claim 3, wherein if the one apparatus has transmitted a command to one of the plurality of apparatus and has received a busy message in response thereto from the one of the plurality of apparatus, and the one apparatus receives one of a command packet, a status request packet and a data request packet from a second one of the plurality of apparatus, then the one apparatus transmits a reject message to the second one of the plurality of apparatus.

29. A method for communicating data by a serial format as claimed in claim 1, wherein the one apparatus receives only one answer packet per corresponding one of the command packet, the status request packet and the data request packet which the one apparatus transmits.

30. A method for communicating data by a serial format as claimed in claim 2, wherein the datum packet has a maximum number of bytes of data in one frame and the maximum number is a predetermined number.

31. A method for communicating data by a serial format as claimed in claim 30, wherein the predetermined number is 16.

32. A method for communicating data by a serial format as claimed in claim 2, wherein the datum packet includes a byte column which indicates a number of data bytes in each frame of the datum packet.

33. A method for communicating data by a serial format as claimed in claim 32, wherein the one of the plurality of apparatus to which the datum packet is transmitted compares the number of data bytes which is indicated by the byte column in the datum packet and a number of data bytes actually received, and if these numbers are different from each other, then it is determined that an error occurred.

34. A method for communicating data by a serial format as claimed in claim 2, wherein each frame of the datum packet is transmitted a plurality of times.

35. A method for communicating data by a serial format as claimed in claim 34, wherein each datum packet includes a data-attribute column which indicates a number of times each frame of the datum packet is transmitted.

36. A communication system for communicating data by one apparatus with a plurality of apparatus by a serial format comprising:
 a command packet communicating member for transmitting a command packet to issue an operation command;
 a status request packet communicating member for transmitting a status request packet to inquire a status of one of the plurality of apparatus;
 a data request packet communicating member for transmitting a data request packet to request data from one of the plurality of apparatus;
 a datum packet communicating member for transmitting a datum packet to communicate pure data to one of the plurality of apparatus;
 an answer packet communicating member for receiving from one of the plurality of apparatus an answer packet responding to one of the command packet, the status request packet and the data request packet;
 an automatic status sending packet communicating member for transmitting an automatic status sending packet to voluntarily communicate a status of the one apparatus; and
 a simulcast packet communicating member for transmitting a simulcast packet to broadcast simulcast datum to the plurality of apparatus.

37. A communication system for communicating data as claimed in claim 36, wherein the command packet, the status request packet, the data request packet, the answer packet, the automatic status sending packet, and the simulcast packet comprise one frame.

38. A communication system for communicating data as claimed in claim 36, wherein the answer packet comprises a reject message for specifying that the system cannot perform a processing of the received packet at a present time, a not-implement message for specifying that a function indicated by the received packet is not implemented by the system at the present time, an illegal+not-implement message for specifying that the system cannot process the received packet because the received packet has a grammatical error or indicates a function not implemented by the system at the present time, a busy message for specifying that the system is currently processing the received packet, and a completed message for specifying that the processing of the received packet is complete.

39. A communication system for communicating data as claimed in claim 37, wherein if said datum packet communicating member communicates a datum packet a plurality of times, then it sets a lock mode in the datum packet.

40. A communication system for communicating data amongst a plurality of apparatus comprising:
 a master apparatus which comprises:
  a command packet communicating member for transmitting a command packet to issue an operation command;
  a status request packet communicating member for transmitting a status request packet to inquire a status of a slave apparatus or another one of the plurality of apparatus;
  a data request packet communicating member for transmitting a data request packet to request data from the slave apparatus or another one of the plurality of apparatus;
  a datum packet communicating member for transmitting a datum packet to communicate pure data to the slave apparatus or another one of the plurality of apparatus;
  an answer packet communicating member for receiving from the slave apparatus or another one of the plurality of apparatus an answer packet responding to one of the command packet, the status request packet and the data request packet;
  an automatic status sending packet communicating member for transmitting an automatic status sending packet to voluntarily inform a status of the master apparatus; and
  a simulcast packet communicating member for transmitting a simulcast packet to broadcast simulcast datum to the plurality of apparatus; and
 a slave apparatus which comprises:
  a command packet communicating member for transmitting a command packet to issue an operation command;
  a status request packet communicating member for transmitting a status request packet to inquire a status of the master apparatus or another one of the plurality of apparatus;
  a data request packet communicating member for transmitting a data request packet to request data from the master apparatus or another one of the plurality of apparatus;
  a datum packet communicating member for transmitting a datum packet to communicate pure data to the master apparatus or another one of the plurality of apparatus;
  an answer packet communicating member for receiving an answer packet responding to one of the command packet, the status request packet and the data request packet;
  an automatic status sending packet communicating member for transmitting an automatic status sending packet to voluntarily inform a status of the slave apparatus; and a simulcast packet communicating member for transmitting a simulcast packet to broadcast simulcast datum to the plurality of apparatus.

41. A communication system for communicating data as claimed in claim 36, further comprising a main controlling member for controlling a communication operation, an address detection member for detecting an address of the received answer packet, a first buffer member for buffering data of the received answer packet, a simulcast address detection member for detecting an address of a received simulcast packet, a second buffer member for buffering data of a received packet that has the address of a simulcast packet, and a lock-unlock control member for controlling a lock or unlock mode of the system.

42. A communication system for communicating data claimed in claim 36 further comprising an address detection member for detecting an address of the received packet, a simulcast address detection member for detecting an address of a simulcast packet, a buffer member for buffering data output from said address detection member and data output from said simulcast address detection member, and a lock-unlock control member for controlling a lock or unlock mode of the system.

43. A communication system for communicating data claimed in claim 40, wherein if said slave apparatus detects that it has been locked a predetermined time by data of a received packet from said master apparatus, then said slave apparatus unlocks by itself.

44. A communication system for communicating data claimed in claim 40, wherein when said master apparatus is transmitting a packet having a plurality of frames in the lock mode, said master apparatus waits for a predetermined waiting time between said plurality of frames.

45. A communication system for communicating data claimed in claim 40, wherein said slave apparatus transmits an acknowledge signal to said master apparatus after receiving each frame of a packet.

46. A communication system for communicating data claimed in claim 40, wherein if said master apparatus has transmitted one of a command packet, a status request packet and a data request packet to said slave apparatus and has received a busy message in response thereto from said slave apparatus, and the master apparatus receives one of a command packet, a status request packet and a data request packet from another apparatus, then said master apparatus transmits a reject message to said another apparatus.

47. A communication system for communicating data claimed in claim 37, wherein the datum packet has a byte column which indicates a number of data bytes in each frame of the datum packet.

48. A communication system for communicating data claimed in claim 37, wherein said datum packet communicating member transmits each frame a plurality of times.

49. A communication system for communicating data as claimed in claim 48, wherein a frame of the datum packet includes a data-attribute column indicating a number of times each frame of the datum packet is transmitted.

50. A communication system for communicating data as claimed in claim 36, wherein said datum packet communicating member communicates data for on-screen display.

* * * * *

UNITED STATES PATENT AND TRADEMARK OFFICE
CERTIFICATE OF CORRECTION

PATENT NO.  : 5,550,826

DATED       : August 27, 1996

INVENTOR(S) : Shigeo Tanaka, et. al.

It is certified that error appears in the above-indentified patent and that said Letters Patent is hereby corrected as shown below:

Col. 5, line 37, after "terminals" insert --,--
Col. 6, line 7, delete "to"
    line 8, delete "to"
    line 26, after "by" insert -switching--
    line 62, change "as the packet" to --as the packet of the data system--
Col. 7, line 11, change "CMS" to --CMD--
    line 37, after "state" insert --,--
    line 47, after "is" second occurrence, insert --a--
    line 54, after "assigned" insert --to--
Col. 9, line 32, change "request" to --requested--
    line 42, change "in" to --to--
Col. 10, line 18, after "or" insert --a--
    line 57, change "frame (acknowledge" to --frame (1-bit acknowledge--
    line 65, change "retransmits" to --re-transmits--
Col. 11, line 46, change "is" to --it--

Col. 14, line 46, change "address" first occurrence to --source--
Col. 15, line 48, change "reference" to --references--
Col. 17, line 27, change "When     CMD" to --When CMD--
    line 59, change "=" to --+--
Col. 18, line 62, change "CMS" to --CMD--

Col. 22, line 53, change "aerial" to --a serial--

UNITED STATES PATENT AND TRADEMARK OFFICE
CERTIFICATE OF CORRECTION

PATENT NO. : 5,550,826
DATED : August 27, 1996
INVENTOR(S) : Shigeo Tanaka, et. al.

It is certified that error appears in the above-indentified patent and that said Letters Patent is hereby corrected as shown below:

Col. 24, line 62, change "the" to --this--

Signed and Sealed this

Twenty-ninth Day of July, 1997

Attest:

BRUCE LEHMAN

Attesting Officer

Commissioner of Patents and Trademarks